United States Patent
Cho et al.

(10) Patent No.: US 10,733,767 B2
(45) Date of Patent: Aug. 4, 2020

(54) METHOD AND DEVICE FOR PROCESSING MULTI-CHANNEL FEATURE MAP IMAGES

(71) Applicant: SAMSUNG ELECTRONICS CO., LTD., Suwon-si (KR)

(72) Inventors: Dae-sung Cho, Suwon-si (KR); Won-jae Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 269 days.

(21) Appl. No.: 15/967,039

(22) Filed: Apr. 30, 2018

(65) Prior Publication Data

US 2018/0350110 A1 Dec. 6, 2018

(30) Foreign Application Priority Data

May 31, 2017 (KR) ........................ 10-2017-0067630

(51) Int. Cl.
*G06K 9/62* (2006.01)
*G06T 9/00* (2006.01)
(Continued)

(52) U.S. Cl.
CPC ................ *G06T 9/002* (2013.01); *G06F 7/08* (2013.01); *G06K 9/4623* (2013.01);
(Continued)

(58) Field of Classification Search
CPC .. G06K 9/4623; G06K 9/4628; G06K 9/4661; G06K 9/6232; G06N 3/02; G06N 3/04; G06N 3/0445; G06N 3/0454; G06T 9/00; G06T 9/002; G06T 9/004; G06F 7/00; G06F 7/02; G06F 7/023; G06F 7/026;
(Continued)

(56) References Cited

U.S. PATENT DOCUMENTS

| | | | |
|---|---|---|---|
| 5,884,004 A | 3/1999 | Sato et al. | |
| 6,801,573 B2 | 10/2004 | Zheng | |

(Continued)

FOREIGN PATENT DOCUMENTS

| | | |
|---|---|---|
| EP | 1 653 744 A1 | 5/2006 |
| KR | 10-2016-0142791 A | 12/2016 |
| WO | 2004/008771 A1 | 1/2004 |

OTHER PUBLICATIONS

Kaiyuan Guo, Lingzhi Sui, Jiantao Qiu, Song Yao, Song Han, Yu Wang, Huazhong Yang, "Angel-Eye: A Complete Design Flow for Mapping CNN onto Customized Hardware", IEEE, Computer Society Annual Symposium on VLSI, Jul. 2016, pp. 24-29 (Year: 2016).*

(Continued)

Primary Examiner — Eric Rush
(74) Attorney, Agent, or Firm — Sughrue Mion, PLLC

(57) ABSTRACT

A convolutional neural network-based image processing method is provided. The method includes: receiving, in a second layer, multi-channel feature map images generated by applying a convolution operation to an input image of a convolutional neural network having a plurality of layers with a plurality of filter kernels of a first layer; analyzing a dynamic range of the multi-channel feature map images; re-ordering the multi-channel feature map images, based on the dynamic range; and processing the re-ordered multi-channel feature map images in the second layer.

20 Claims, 13 Drawing Sheets

(51) Int. Cl.
*G06N 3/04* (2006.01)
*G06K 9/46* (2006.01)
*G06F 7/08* (2006.01)

(52) U.S. Cl.
CPC ......... *G06K 9/4628* (2013.01); *G06K 9/6232* (2013.01); *G06N 3/04* (2013.01); *G06N 3/0454* (2013.01); *G06T 9/00* (2013.01); *G06T 9/004* (2013.01)

(58) Field of Classification Search
CPC ..... G06F 7/06; G06F 7/08; G06F 7/22; G06F 7/24; G06F 7/26; G06F 7/76; G06F 2207/4824; H04N 19/00; H04N 19/114; H04N 19/169; H04N 19/17; H04N 19/42; H04N 19/50; H04N 19/503; H04N 19/593; H04N 19/61; H04N 19/63; H04N 19/635; H04N 19/64; H04N 19/645; H04N 19/88
USPC ....... 382/155, 156, 158, 160, 232, 233, 236, 382/238–240, 244; 375/240, 240.02, 375/240.08, 240.12, 240.13, 240.14, 375/240.18, 240.26, 240.29; 348/384.1, 348/388.1, 390.1, 393.1, 394.1, 395.1, 348/396.1, 399.1, 415.1, 417.1, 418.1, 348/421.1, 422.1, 425.3, 430.1; 706/15, 706/17, 22, 26, 27
See application file for complete search history.

(56) References Cited

U.S. PATENT DOCUMENTS

| | | | |
|---|---|---|---|
| 7,864,863 | B2 | 1/2011 | Francois et al. |
| 2016/0062947 | A1* | 3/2016 | Chetlur ................ G06F 17/153 708/420 |
| 2016/0300121 | A1 | 10/2016 | Chertok et al. |
| 2017/0011288 | A1 | 1/2017 | Brothers et al. |
| 2017/0061246 | A1 | 3/2017 | Chen et al. |
| 2017/0140260 | A1 | 5/2017 | Manning et al. |
| 2017/0200078 | A1* | 7/2017 | Bichler .................. G06N 3/049 |
| 2018/0046903 | A1* | 2/2018 | Yao ....................... G06N 3/0481 |
| 2018/0082181 | A1* | 3/2018 | Brothers ................ G06N 3/082 |
| 2018/0096226 | A1* | 4/2018 | Aliabadi ............... G06K 9/6219 |
| 2018/0174051 | A1* | 6/2018 | Knittel ................... G06N 3/04 |
| 2018/0315154 | A1* | 11/2018 | Park .................... G06K 9/00973 |

OTHER PUBLICATIONS

International Search Report (PCT/ISA/210) and Written Opinion (PCT/ISA/237) dated Oct. 4, 2018 issued by the International Searching Authority in International Application No. PCT/KR2018/004978.

Jimmy SJ. Ren et al., "On Vectorization of Deep Convolutional Neural Networks for Vision Tasks", Proceedings of the Twenty-Ninth AAAI Conference on Artificial Intelligence, Jan. 30, 2015, pp. 1840-1846 (12 pages total).

Han Zhang et al., "SPDA-CNN: Unifying Semantic Part Detection and Abstraction for Fine-grained Recognition", 2016 IEEE Conference on Computer Vision and Pattern Recognition (CVPR), Jul. 1, 2016, pp. 1143-1152 (52 pages total).

Hyunwoong Jang et al., "Automatic Tagging for Social Images using Convolution Neural Networks", Journel of KIISE, vol. 43, No. 1, pp. 47-53, 2016. (7 pages total).

Jiwon Kim et al., "Accurate Image Super-Resolution Using Very Deep Convolutional Networks", CVPR, arXiv:1511.04587v2 [cs.CV], Nov. 11, 2016, (9 pages total).

Chao Dong et al, "Learning a Deep Convolutional Network for Image Super-Resolution", ECCV, pp. 1-16, 2014. (16 pages total).

Wenzhe Shi et al., "Real-Time Single Image and Video Super-Resolution Using an Efficient Sub-Pixel Convolutional Neural Network", CVPR, 2016, pp. 1874-1883. (10 pages total).

Jiwon Kim et al., "Deeply-Recursive Convolutional Network for Image Super-Resolution", CVPR, aeXiv:1511.04491v2 [cs.CV], Nov. 11, 2016. (9 pages total).

Chao Dong et al., "Accelerating the Super-Resolution Convolutional Neural Network : Supplementary File", arXiv:1608.00367, pp. 1-5. (5 pages total).

Alex Greaves et al., "Multi-Frame Video Super-Resolution Using Convolutional Neural Networks", Stanford University Course Project Reports, Winter 2016, pp. 1-9. (9 pages total).

Ahmed Hagag et al., "Multispectral image compression with band ordering and wavelet transforms", SIViP, Jun. 28, 2013, vol. 9, pp. 769-778. (10 pages total).

Xiaoli Tang et al., "Hyperspectral Image Compression Using Three-Dimensional Wavelet Coding: A Lossy-to-Lossless Solution", Center for Image Processing Research, Rensselaer Polytechnic Institute, Mar. 17, 2004, pp. 1-22. (22 pages total).

Chao Dong et al., "Image Super-Resolution Using Deep Convolutional Networks", arXiv:1501.00092v3 [cs.Cv], Jul. 31, 2015, pp. 1-14. (14 pages total).

Wang et al., "Lossless Hyperspectral-Image Compression. Using Context-Based Conditional Average", IEEE Transactions on Geoscience and Remote Sensing, vol. 45, No. 12, Dec. 2007, p. 4187-4193, 7 pages total, XP011196748.

Miaou et al., "A Lossless Compression Method for Medical image Sequences Using JPEG-LS and Interframe Coding", IEEE Transactions on Information Technology in Biomedicine, vol. 13, No. 5, Sep. 2009, pp. 818-821. 4 pages total, XP011345591.

Simonyan et al., "Very Deep Convolutional Networks for Large-Scale Image Recognition", Apr. 10, 2015, pp. 1-14, 14 pages total, XP055555399.

Liang et al., "Recurrent Convolutional Neural Network for Object Recognition", 2015: pp. 3367-3375, 9 pages total, XP032793786.

Communication dated Dec. 5, 2019 issued by the European Patent Office in counterpart European Application No. 18809961.8.

* cited by examiner

METHOD AND DEVICE FOR PROCESSING MULTI-CHANNEL FEATURE MAP IMAGES

CROSS-REFERENCE TO RELATED APPLICATION

This application is based on and claims priority under 35 U.S.C. § 119 to Korean Patent Application No. 10-2017-0067630, filed on May 31, 2017, in the Korean Intellectual Property Office, the disclosure of which is incorporated by reference herein in its entirety.

BACKGROUND

1. Field

The disclosure relates to artificial intelligence (AI) systems and applications thereof that utilize machine learning algorithms, and more particularly, to techniques for compressing multi-channel feature map images generated in a convolutional neural network-based image processing process.

2. Description of Related Art

An artificial intelligence (AI) system is a computer system that mimics human-level intelligence and learns and judges by itself. The more the system is used, the more the results of the system are improved (e.g., a recognition rate).

AI technology includes machine learning (deep learning) technology using an algorithm that classifies/learns characteristics of input data by itself and element technologies that simulate functions of recognition, judgment, etc. of the human brain by utilizing a machine learning (deep learning) algorithm.

The element technologies may include, for example, at least one of linguistic understanding technology for recognizing human language/characters, visual recognition technology for recognizing objects in the manner of human vision, reasoning/prediction technology for judging and logically reasoning and predicting information, knowledge representation technology for processing human experience information as knowledge data, and motion control technology for controlling autonomous driving of a vehicle and the motion of a robot.

In particular, visual recognition technology, which is a technology for recognizing and processing objects in the manner of human vision, includes object recognition, object tracking, image retrieval, human recognition, scene understanding, spatial understanding, and image enhancement.

SUMMARY

Provided are methods and devices for processing multi-channel feature map images, according to various embodiments. Additional aspects will be set forth in part in the description which follows and, in part, will be apparent from the description, or may be learned by practice of the presented embodiments.

In accordance with an aspect of the disclosure, there is provided a convolutional neural network-based image processing method, the method including: receiving, in a second layer, multi-channel feature map images generated by applying a convolution operation to an input image of a convolutional neural network having a plurality of layers with a plurality of filter kernels of a first layer; analyzing a dynamic range of the multi-channel feature map images; re-ordering the multi-channel feature map images, based on the dynamic range; and processing the re-ordered multi-channel feature map images in the second layer.

The analyzing may include obtaining the dynamic range for each of the multi-channel feature map images, based on a maximum output value and a minimum output value of each of the filter kernels of the first layer.

The re-ordering may include aligning the multi-channel feature map images in a descending order or an ascending order in a channel direction, based on the dynamic range.

The processing may include performing inter-channel inter-prediction on the re-ordered multi-channel feature map images.

The processing may include performing encoding and decoding operations on the re-ordered multi-channel feature map images, and the encoding and decoding operations in the second layer may be performed according to a pipelined process with a convolution operation in a layer subsequent to the second layer among the plurality of layers.

The processing may include determining a coding unit having a pixel depth in a channel direction of the multi-channel feature map images, the pixel depth may correspond to a number of channels in the channel direction in the multi-channel feature map images, and the number of channels may correspond to a number of the plurality of filter kernels of the first layer.

The coding unit may correspond to a basic unit of a filter kernel operation in a layer subsequent to the second layer among the plurality of layers.

A size of the coding unit may be $X \times Y \times Z$, where X, Y, and Z are integers.

The processing may further include: dividing the coding unit into sub-coding units in the channel direction; and performing encoding on each of the sub-coding units.

The performing of encoding on each of the sub-coding units may include: encoding information on whether an encoding mode of a current sub-coding unit is equal to an encoding mode of a previous sub-coding unit; and encoding information on the encoding mode of the current sub-coding unit when the encoding mode of the current sub-coding unit is not equal to the encoding mode of the previous sub-coding unit.

In accordance with another aspect of the disclosure, there is provided a convolutional neural network-based image processing device, the device including: a storage; and a controller configured to control the image processing device to receive, in a second layer, multi-channel feature map images generated by applying a convolution operation to an input image of the convolutional neural network having a plurality of layers with a plurality of filter kernels of a first layer, to analyze a dynamic range of the multi-channel feature map images, to re-order the multi-channel feature map images, based on the dynamic range, to process the re-ordered multi-channel feature map images in the second layer, and to store the processed re-ordered multi-channel feature map images in the storage.

The controller may be configured to control the image processing device to obtain the dynamic range for each of the multi-channel feature map images, based on a maximum output value and a minimum output value of each filter kernel of the first layer.

The controller may be further configured to control the image processing device to align the multi-channel feature map images in a descending order or an ascending order in a channel direction, based on the dynamic range.

The controller may be further configured to control the image processing device to perform inter-channel inter-prediction on the re-ordered multi-channel feature map images.

The controller may be further configured to control the image processing device to perform encoding and decoding operations on the re-ordered multi-channel feature map images, wherein the controller may control the image processing device to perform the encoding and decoding operations in the second layer according to a pipelined process with a convolution operation in a layer subsequent to the second layer among the plurality of layers.

The controller may control the image processing device to determine a coding unit having a pixel depth in a channel direction of the multi-channel feature map images, the pixel depth may correspond to a number of channels in the channel direction in the multi-channel feature map images, and the number of channels may correspond to a number of the plurality of filter kernels of the first layer.

The coding unit may correspond to a basic unit of a filter kernel operation in a layer subsequent to the second layer among the plurality of layers.

A size of the coding unit may be X×Y×Z, where X, Y, and Z are integers.

The controller may control the image processing device to divide the coding unit into sub-coding units in the channel direction, and may perform encoding on each of the sub-coding units.

The controller may control the image processing device to encode information on whether an encoding mode of a current sub-coding unit is equal to an encoding mode of a previous sub-coding unit, and to encode information on the encoding mode of the current sub-coding unit when the encoding mode of the current sub-coding unit is not equal to the encoding mode of the previous sub-coding unit.

In accordance with another aspect of the disclosure, there is provided a non-transitory computer-readable recording medium having stored thereon program commands which, when executed, cause a convolution neural network-based image process device to perform: receiving, in a second layer, multi-channel feature map images generated by applying a convolution operation to an input image of a convolutional neural network having a plurality of layers with a plurality of filter kernels of a first layer; analyzing a dynamic range of the multi-channel feature map images; re-ordering the multi-channel feature map images, based on the dynamic range; and processing the re-ordered multi-channel feature map images in the second layer.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
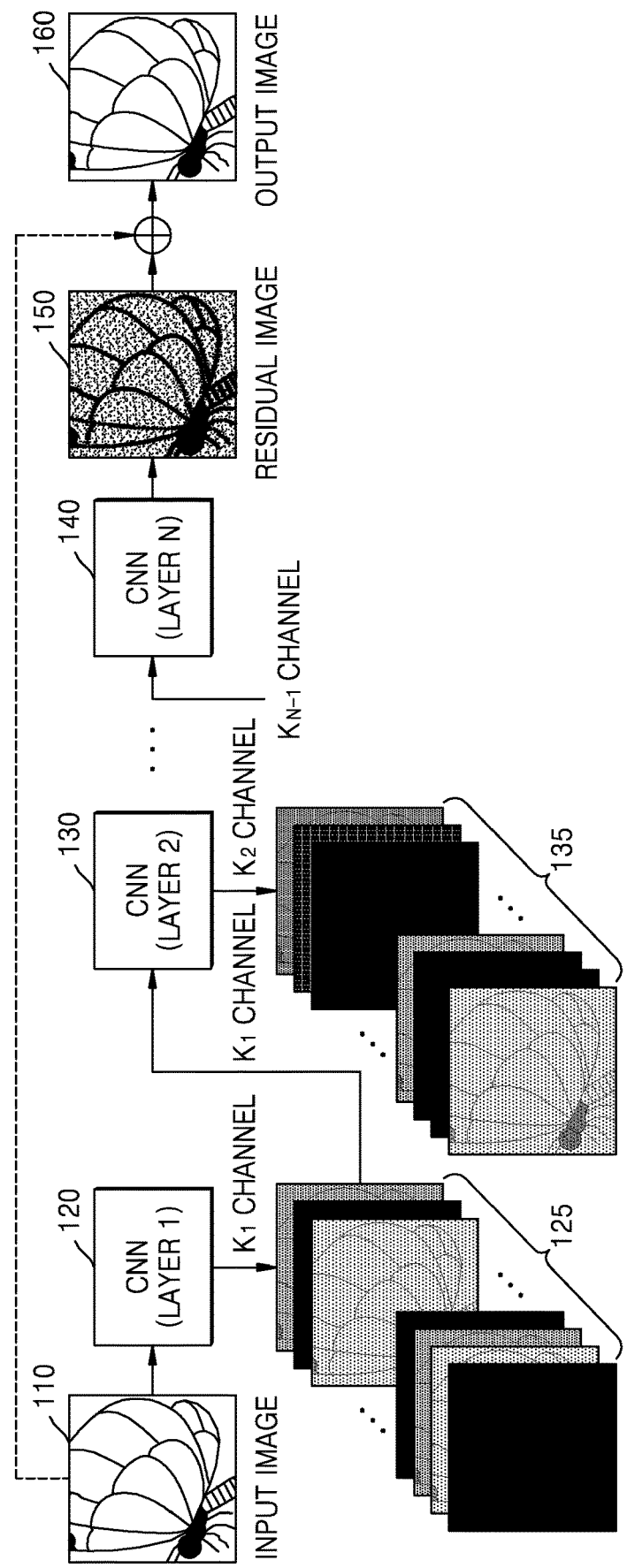
FIG. 1 is a view of a convolutional neural network-based image processing process.

A term "unit" used in the specification indicates a software or hardware component such as field-programmable logic array (FPLA) and application-specific integrated circuit (ASIC), and the "unit" performs a particular function. However, the "unit" is not limited to software or hardware. The "unit" may be configured to be stored in an addressable storing medium or to play back one or more processors. Accordingly, the "unit" may include, for example, software components, object-oriented software components, components such as class components and task components, processors, formulas, attributes, procedures, subroutines, segments of program codes, drivers, firmware, micro codes, circuits, data, database, data structures, tables, arrays and variables. Functions provided in components and "units" may be combined into a smaller number of components and "units", or may be further divided into additional components and "units."

Below, certain embodiments will now be described in greater detail with reference to attached drawings such that one with an ordinary skill in the art may easily perform embodiments. However, an embodiment may have different forms and should not be construed as being limited to the descriptions set forth herein. In the description of the disclosure, certain detailed explanations of the related art are omitted when it is deemed that they may unnecessarily obscure the essence of the disclosure.

General and widely used terms have been employed herein, in consideration of functions provided in the embodiments, and may vary according to an intention of one of ordinary skill in the art, a precedent, or emergence of new technologies. Additionally, in some cases, an applicant may arbitrarily select specific terms, in which case, the applicant will provide the meaning of the terms in the description of the embodiments. Accordingly, it will be understood that the terms used herein should be interpreted as having a meaning that is consistent with their meaning in the context of the relevant art and will not be interpreted in an idealized or overly formal sense unless expressly so defined herein.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

A neural network refers to a computational architecture that models a biological brain. In the neural network, nodes corresponding to neurons in the brain are connected to each other and collectively operate to process input data. Examples of various types of neural networks include a convolutional neural network (CNN), a recurrent neural network (RNN), a deep belief network (DBN), and a restricted Boltzmann (RBM), but the disclosure is not limited thereto. In a feed-forward neural network, neurons of the neural network have links to other neurons. Such links may be extended in only one direction, for example, a forward direction, through the neural network.

The CNN may be used to extract features such as borders, line colors, etc., from complex input data. The CNN may include a plurality of layers. Each layer may receive input data and process the input data to generate output data. The output data may be a feature map generated by convoluting an input image or an input feature map with filter kernels. Initial layers of the CNN may be operated to extract low level features such as edges or gradients from the input data. The subsequent layers of the neural network may extract gradually more complex features such as eyes, a nose, and the like.

One or more embodiments disclosed herein relate to image processing based on the CNN. In more detail, the one or more embodiments relate to reducing memory access and internal network bandwidth consumption of the CNN in an image processing process based on the CNN. The one or more embodiments may enhance efficient use of an internal memory and reduce the frequency of data accesses to an external memory or a high-level cache memory, the data accesses being performed in the image processing process.

In addition, one or more embodiments may reduce data traffic and associated storage capacity for intermediate results during forward execution of the CNN. Here, executing the CNN may refer to processing data of the CNN using a layer (e.g., using a device such as a processor, a computing unit, etc.). An example of "data processing" also includes applying filter kernels to data provided as an input to a layer generating multi-channel feature map images. Also, "intermediate result" may refer to a result of encoding or decoding of multi-channel feature map images performed in at least one layer of the CNN.

Hereinafter, with reference to FIGS. 1 and 2, an overall process of image processing based on the CNN will now be described. With reference to FIGS. 3 to 4B and 12 to 14, an image encoding or decoding process performed on feature map images extracted from each feature extraction layers (e.g., convolution layers) will be described in detail. Meanwhile, with reference to FIGS. 5 to 11, a compression structure of feature map images will be described in detail.

According to the compression structure of the feature map images, pipeline processing between a CNN operation and an image compression operation (i.e., encoding or decoding) may be possible. Therefore, data traffic in the CNN may be significantly reduced, and the power required to obtain calculation results may also be reduced. Also, the frequency of reading or writing, from a memory, data related to intermediate results or weights of feature classification layers is reduced, so that the execution speed may be increased, and power consumption and a burden of memory storage may be decreased.

The CNN may be used for many applications such as object recognition, image reconstruction, semantic segmentation, scene recognition, or the like with respect to an image. The object recognition represents image processing that detects or recognizes specific objects such as cats, cars, chairs, etc. in an image. The image reconstruction represents image processing that attempts to correct images. Examples of the image reconstruction may include super-resolution reconstruction such as sharpening a blurred image. The semantic segmentation represents image processing that labels portions of an image. The scene recognition represents image processing that determines a specific scene, such as an office, a bedroom, a playground, etc., in the image. In addition to these visual examples, there may be many other application domains to which a similar CNN can be efficiently applied.

The CNN may be compute-intensive. For example, the CNN performs many operations on each image, requires many weights, and generates many intermediate result traffics. In addition, the CNN may perform giga-operation per second (GOPS) for each image, use approximately hundreds of millions to billions of weights, and generate hundreds of gigabytes of intermediate data. In many implementations, weights and intermediate data traffic are costly in terms of power efficiency. As computational efficiency of the CNN increases, such traffic will take up a greater share of the power consumed to execute the CNN, and thus there is a limitation in using the CNN in a power-limited mobile device, application, or computing environment. In an embodiment, a method of minimizing the delay of a read/write operation from internal or external memory by a method of efficiently compressing multi-channel feature map images generated in a CNN-based image processing process.

FIG. 1 is a view of a CNN-based image processing process.

FIG. 1 shows an input image 110, a plurality of layers 120, 130, and 140, multi-channel feature map images 125 and 135, a residual image 150 processed by a plurality of layers 120, 130, and 140, and an output image 160. For example, the input image 110 may be an image to be processed through the CNN.

The plurality of layers 120, 130, and 140 according to an embodiment extract a feature of an image by applying a filter of a certain size from an upper left end to a lower right end of input data.

For example, the plurality of layers 120, 130, and 140 may multiply a left upper 3×3 pixel of the input data by a weight, and map it to a neuron at an upper left end of a feature map. The weight to be multiplied will also be 3×3. Thereafter, in the same process, the plurality of layers 120, 130, and 140 scan the input data from left to right and from top to bottom one by one, and multiply the weight to map a neuron of the feature map. Here, the used 3×3 weight is referred to as a filter or a filter kernel.

That is, a process of applying a filter in the plurality of layers 120, 130, and 140 is a process of performing a convolution operation with a filter kernel, and the extracted result is referred to as a "feature map image."

The term "multi-channel feature map images" refers to sets of feature map images corresponding to a plurality of channels, and may be, for example, plural pieces of image data. The multi-channel feature map images 125 and 135 may be received as an input and processed by respective layers 120, 130, and 140 of the CNN and generated as an output. According to an embodiment, the multi-channel feature map images 125 and 135 may be generated by the plurality of layers 120, 130, and 140, also referred to as "feature extraction layers" or "convolution layers" of the CNN.

A layer of the CNN may define mapping of outputs to inputs. The mapping defined by the layer is executed as one or more filter kernels (convolution kernels) to be applied to the input data to generate feature map images to be output to the next layer. The input data may be an image or feature map images of a specific layer.

Referring to FIG. 1, during forward execution, layer 120 receives input image 110 and generates multi-channel feature map images 125 as an output. In addition, during forward execution, the next layer 130 receives the multi-channel feature map images 125 as an input and generates multi-channel feature map images 135 as an output. Then, each subsequent layer will receive multi-channel feature map images generated in the previous layer and generate the next multi-channel feature map images as an output. Finally, the residual image 150 is generated in an $L^{th}$ (L is an integer) layer 140 by receiving multi-channel feature map images generated in an $(L-1)^{th}$ layer. According to an embodiment, when the residual image 150 is generated, the output image 160 may be generated by summing the residual image 150 with the input image 110. According to an embodiment, the input image 110 may be a low-resolution image and the output image 160 may be a high-resolution image. That is, the image processing process of FIG. 1 may be understood as a super-resolution reconstruction process of reconstructing a low-resolution image into a high-resolution image.

According to an embodiment, a data flow during the CNN-based image processing process proceeds from the input image 110 to the multi-channel feature map images 125, the multi-channel feature map images 135, the residual image 150, and the output image 160. One or more or all layers that receive and generate the multi-channel feature map images 125 and 135 may be hidden layers (e.g., hidden convolution layers). Meanwhile, other processing operations may be performed in addition to operations that apply convolution kernels that map input feature map images to output feature map images. Examples of the other processing operations may include, but are not limited to, applications such as activation functions, pooling, resampling, and the like.

In the example of FIG. 1, the multi-channel feature map images 125 generated in the first layer 120 include feature map images corresponding to K1 (K1 is an integer) channels. Also, the multi-channel feature map images 135 generated in the second layer 130 include feature map images corresponding to K2 (K2 is an integer) channels. Here, K1 and K2, which represent the number of channels, correspond to the number of filter kernels used in the first layer 120 and the second layer 130, respectively. That is, the number of multi-channel feature map images generated in an $I^{th}$ layer (I is an integer of 1 or more, and an integer of L−1 or less) is equal to the number of filter kernels used in the $I^{th}$ layer.

Figure 2:
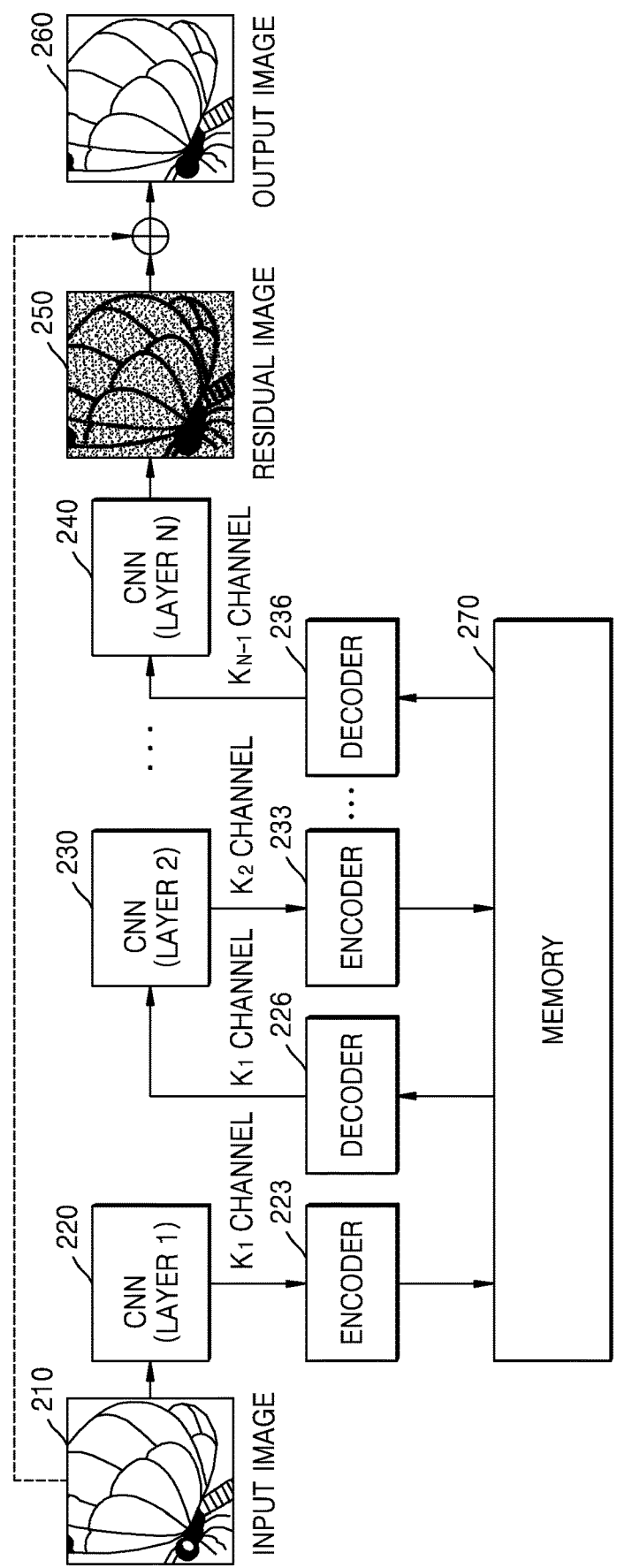
FIG. 2 is a view of compression processing for multi-channel feature map images generated in a convolutional neural network-based image processing process.

FIG. 2 is a view of compression processing for multi-channel feature map images generated in a CNN-based image processing process.

FIG. 2 shows an input image 210, a plurality of layers 220, 230, and 240, encoders 223 and 233, decoders 226 and 236, a residual image 250, an output image 260, and a memory 270.

The input image 210, the plurality of layers 220, 230, and 240, the residual image 250, and the output image 260 of FIG. 2 correspond to the input image 110, the plurality of layers 120, 130, and 140, the residual image 150, and the output image 160, and detailed description thereof will not be repeated herein.

Referring to FIG. 2, the encoders 223 and 233 according to an embodiment encode intermediate data during execution in a CNN. In addition, the decoders 226 and 236 according to an embodiment decode intermediate data while the CNN is executed. The term "intermediate data" refers to data of the multi-channel feature map images generated by hidden convolutional layers of the CNN, for example, layers 1 to N.

Referring to FIG. 2, the memory 270 may be used to store a large amount of intermediate data generated while the CNN is executed. The memory 270 may also be used to store a large number of filter kernels used in the plurality of layers 220 and 230.

The multi-channel feature map images may include tens or hundreds of feature map images. As an example, each feature map image may be a two-dimensional (2D) image of 16-bit values representing the intensity of features trained at all x and y positions. In an image processing process according to an embodiment, each feature map output by the $I^{th}$ layer needs to be read from the memory 270 in order to generate each feature map image for an $(I+1)^{th}$ layer of the CNN. For example, when the Ith layer generates 64 feature map images (i.e., feature map images having 64 channels) as inputs of the $(I+1)^{th}$ layer and the $(I+1)^{th}$ layer generates 64 feature map images, each feature map image of the $I^{th}$ layer needs to be read from the memory 270 64 times for the execution of the $(I+1)^{th}$ layer. Therefore, during the operation of the CNN, a total of 64 feature map images need to be read from the $I^{th}$ layer.

As described above, each layer of the CNN need to repeatedly perform read and write operations for the memory 270 to generate intermediate data. Meanwhile, as the number of multi-channel feature map images generated as intermediate data increases, the frequency of access to the memory 270 increases as well, resulting in a problem that transmission capacity of images becomes excessive. For example, when the CNN of FIG. 2 has 20 layers and the number of multi-channel feature map images generated in each layer is 64, a total of 1216 feature map images in a total of 19 layers except for the last layer require a read/write operation. Therefore, in order to reduce transmission capacity required when accessing the memory 270 in each layer of the CNN, it is necessary to perform compression processing on multi-channel feature map images.

For the compression processing of multi-channel feature map images, existing Joint Photographic Experts Group (JPEG), JPEG2000, portable network graphics (PNG), or Lempel-Ziv run-length coding methods may be applied to feature map images of each channel. In addition, a compression method based on inter-channel prediction may be applied based on a Motion Picture Expert Group (MPEG) method. In addition, storage capacity of multi-channel feature map images may be reduced by applying a three-dimensional (3D) set partitioning in hierarchical trees (SPIHT) method in which a wavelet compression method of a single image is extended to a multi-channel image.

However, although the compression methods described above may reduce storage capacity of images, transmission capacity from an embedded system to an external memory may not be reduced. For a CNN computational operation, a compression processing unit needs to be defined in a structure that reads specific pixels at an identical position in each channel of multi-channel feature map images at the same time as necessary for the CNN computational operation and stores the result in a memory immediately. However, the compression methods referenced above have a problem in that a large delay occurs in the compression processing or the memory required for data storage needs to be large because basic units of the CNN computational operation and the compression processing do not coincide with each other.

Hereinafter, disclosed is a method of reducing memory access of the CNN and bandwidth consumption of an internal network by efficiently encoding and/or decoding multi-channel feature map images generated in the CNN-based image processing process according to an embodiment.

Figure 3:
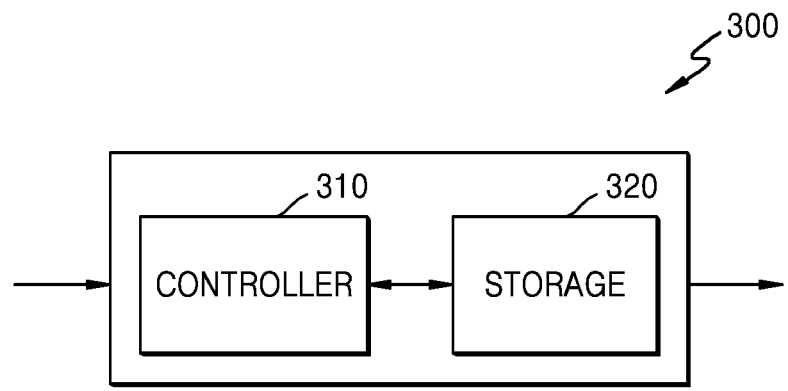
FIG. 3 is a block diagram of an image processing device according to an embodiment.

FIG. 3 is a block diagram of an image processing device 300 according to an embodiment.

Referring to FIG. 3, the image processing device 300 according to an embodiment includes a controller 310 and a storage 320. The controller 310 according to an embodiment may control operations of the image encoding device 400 of FIG. 4A and the image decoding device 450 of FIG. 4B. The storage 320 according to an embodiment may correspond to the memory 270 of FIG. 2.

According to an embodiment, the controller 310 may control multi-channel feature map images generated in the previous layer to be received at the current layer and stored in the storage 320. Also, the controller 310 may analyze a dynamic range of the stored multi-channel feature map images. Also, the controller 310 may control the received multi-channel feature map images to be re-ordered based on the dynamic range. The analysis and re-ordering of the dynamic range will be described in detail with reference to FIG. 7.

According to an embodiment, the controller 310 may process multi-channel feature map images re-ordered in the current layer. Here, the processing of the multi-channel feature map images may refer to performing encoding and decoding operations on the multi-channel feature map images.

According to an embodiment, the storage 320 may store various data, programs, or applications for driving and controlling the image processing device 300 under the control of the controller 310. The term "storage" in an embodiment may include, but is not limited to, the storage 320, read-only memory (ROM) or random access memory (RAM) of a controller, and may further include external memory (e.g., a server, a micro SD card, universal serial bus (USB) memory, etc.). In addition, the storage 320 may include a non-volatile memory, a volatile memory, a hard disk drive (HDD), or a solid state drive (SSD).

Hereinafter, encoding and decoding operations controlled by the controller 310 will be described in detail with reference to FIGS. 4A and 4B.

Figure 4A:
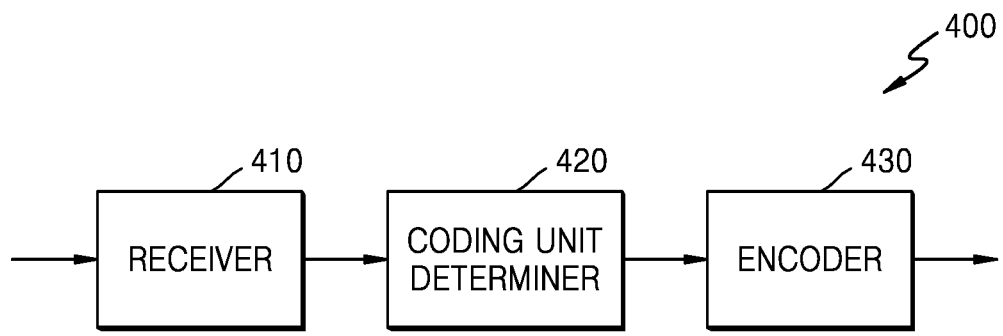
FIG. 4A is a block diagram of an image encoding device in an image processing device, according to an embodiment.

FIG. 4A is a block diagram of the image encoding device 400 in the image processing device 300, according to an embodiment.

The image encoding device 400 of FIG. 4A may be included in the image processing device 300 of FIG. 3. Operations of the image encoding device 400 may be controlled by the controller 310.

The image encoding device 400 according to an embodiment includes a receiver 410, a coding unit determiner 420, and an encoder 430. The encoder 430 of FIG. 4A may correspond to the encoders 223 and 233 of FIG. 2.

According to an embodiment, the receiver 410 receives multi-channel feature map images generated in a specific layer of the CNN.

According to an embodiment, the coding unit determiner 420 determines a coding unit for encoding the multi-channel feature map images. The coding unit determiner 420 according to an embodiment may determine the coding unit to have a pixel depth corresponding to the number of channels in a channel direction in sets of feature map images.

For example, when the number of multi-channel feature map images is K (K is an integer), and the width and height of a feature map image corresponding to each channel is W and H pixels (W and H are integers), an array structure of the multi-channel feature map images may be denoted as W×H×K. Sizes of the coding unit may be determined as X×Y×Z (where X, Y, and Z are integers less than W, H, and K, respectively).

Unlike a general 2D image, objects to be encoded in a CNN-based image processing process are multi-channel feature map images composed of sets of 2D images. Therefore, the array structure of sets of the multi-channel feature map images may be understood as three-dimensional (3D), and the coding unit for encoding the multi-channel feature map images may also be a 3D form. Accordingly, the coding unit determiner 420 may determine sets of blocks or pixels existing at the same position in each channel of the multi-channel feature map images as the coding unit. However, a shape of the coding unit may be any geometric shape, and is not limited to a certain size of data unit.

The coding unit determiner 420 according to an embodiment sets a type and size of the coding unit determined for the multi-channel feature map images. The coding unit may be variably set to the type and size of the coding unit. In addition, according to an embodiment, the coding unit determiner 420 may determine one or more sub-coding units to be divided from the coding unit.

Meanwhile, multi-channel feature map images need to be used in the next layer as soon as they are generated in a specific layer in the CNN. That is, the multi-channel feature map images generated in a specific layer in the CNN need to be stored in a memory for a certain time until they are coded and used in the next layer. However, when operations of the next layer are stopped until decoding of encoded multi-channel feature map images is completed and are started only after the decoding of the multi-channel feature map images is completed, there is a problem that an image processing time is excessively delayed. Therefore, it is necessary to perform encoding/decoding operations of the multi-channel feature map images in parallel with a convolution operation with a filter kernel of the next layer in order to effectively shorten the image processing time.

The coding unit determiner 420 determines a coding unit of the multi-channel feature map images according to various embodiments, thereby enabling pipeline processing with a CNN computational operation. A specific method by which the coding unit determiner 420 determines the coding unit will be described in detail with reference to FIGS. 5 to 10.

A type and size of the coding unit may be determined based on rate-distortion (R-D) cost calculation. The type and size of the coding unit may be determined differently for each layer of the CNN, or may be determined differently corresponding to the number of channels included in the multi-channel feature map images. The type and size of the determined coding unit are output to the encoder 430 together with image data for each coding unit.

According to an embodiment, the determined coding units may be predicted or transformed (e.g., values of a pixel domain are transformed to values of a frequency domain) based on processing units of different sizes. In other words, the image encoding device 400 may perform a plurality of processing operations for image encoding based on processing units of various sizes and various types. Processing operations such as prediction, transformation, and entropy encoding are performed to encode image data. However, processing units of the same size may be used in all operations, or processing units of different sizes may be used in respective operations.

According to an embodiment, a prediction mode of a coding unit may be at least one of an intra-prediction mode, an inter-channel inter-prediction mode, and a skip mode, and a specific prediction mode may be performed only on a coding unit of a specific size or type. According to an embodiment, a prediction mode with the smallest encoding error may be selected by performing prediction on each coding unit.

In addition, the image encoding device 400 may transform the image data based on a processing unit having a size different from that of the coding unit. The transformation may be performed based on a data unit having a size equal to or smaller than the coding unit in order to transform the coding unit.

Not only information on the type and size of the coding unit, but also prediction related information and transformation related information are required for encoding. Therefore, the encoder 430 may determine the type of a coding unit generating a minimum encoding error, a size of the coding unit, a prediction mode for each coding unit, the size of a transform unit for transformation, and the like.

According to one embodiment, the encoder 430 may measure a coding error of a coding unit using Lagrange Multiplier-based rate-distortion optimization.

According to an embodiment, a transmitter outputs image data of a coding unit encoded by the encoder 430 and information on an encoding mode for each coding unit in the form of a bitstream and transmits the output to the memory 270. A method of transmitting the image data of the coding unit encoded by the encoder 430 to a payload in a bitstream will be described in detail with reference to FIG. 11.

According to an embodiment, the encoded image data may be a result of encoding residual data of an image. The information on an encoding mode for each coding unit may include the type of a coding unit, a size of the coding unit, information on a prediction mode for each coding unit, size information of a transform unit, and the like.

According to an embodiment, an encoded bitstream output from the image encoding device 400 may be stored in external random access memory (RAM) or other cache memory, or in an on-die storage (e.g., internal memory).

Figure 4B:
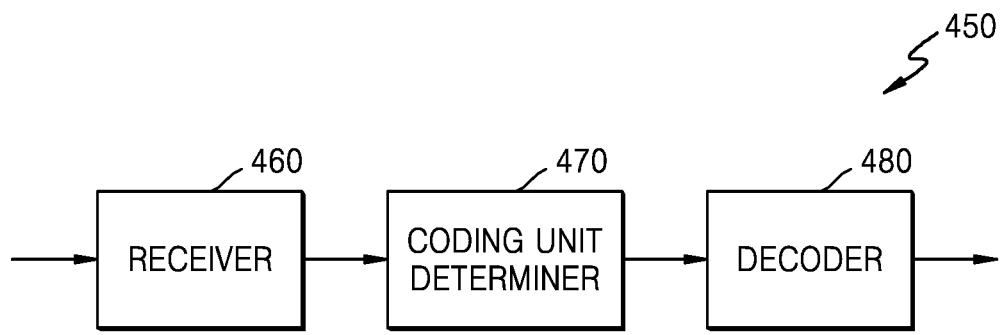
FIG. 4B is a block diagram of an image decoding device in an image processing device, according to an embodiment.

FIG. 4B is a block diagram of the image decoding device 450 in the image processing device 300 according to an embodiment.

The image decoding device 450 of FIG. 4B may be included in the image processing device 300 of FIG. 3. Operations of the image decoding device 450 may be controlled by the controller 310.

Referring to FIG. 4B, the image decoding device 450 according to an embodiment includes a receiver 460, a coding unit determiner 470, and a decoder 480. The decoder 480 of FIG. 4A may correspond to the decoders 226 and 236 of FIG. 2.

The receiver 460 according to an embodiment parses a bitstream received from the memory 270 by the image decoding device 450 to obtain image data for each coding unit and outputs the encoded image data to the coding unit determiner 470 and the decoder 480. The receiver 460 may extract the encoded image data from the payload of the bitstream, and may further extract information on a coding unit, prediction mode information on each coding unit, size information on the transform unit for transformation, and the like from a header or a parameter set raw byte (RB) sequence payload (RBSP). The information on the coding unit may include at least one of the type and size of the coding unit.

The coding unit determiner 470 according to an embodiment determines a coding unit for decoding the multi-channel feature map images based on the information on the coding unit obtained by the image decoding device 450. As in the image encoding device 400, the coding unit determiner 470 of the image decoding device 450 may determine the coding unit to have a pixel depth corresponding to the number of channels in a channel direction in sets of feature map images.

The decoder 480 according to an embodiment decodes image data of each coding unit based on the coding unit determined by the coding unit determiner 470 to reconstruct multi-channel characteristic map images. The decoding process may include inverse quantization, inverse transformation, intra-prediction, and inter-channel inter-prediction.

The decoder 480 according to an embodiment may generate residual data by performing inverse quantization and inverse transformation for each coding unit. The decoder 480 may perform intra-prediction or inter-prediction based on information on a prediction mode of the coding unit. The decoder 480 may perform the prediction on the coding unit, and then generate reconstructed data using prediction data and residual data of the coding unit.

Figure 5:
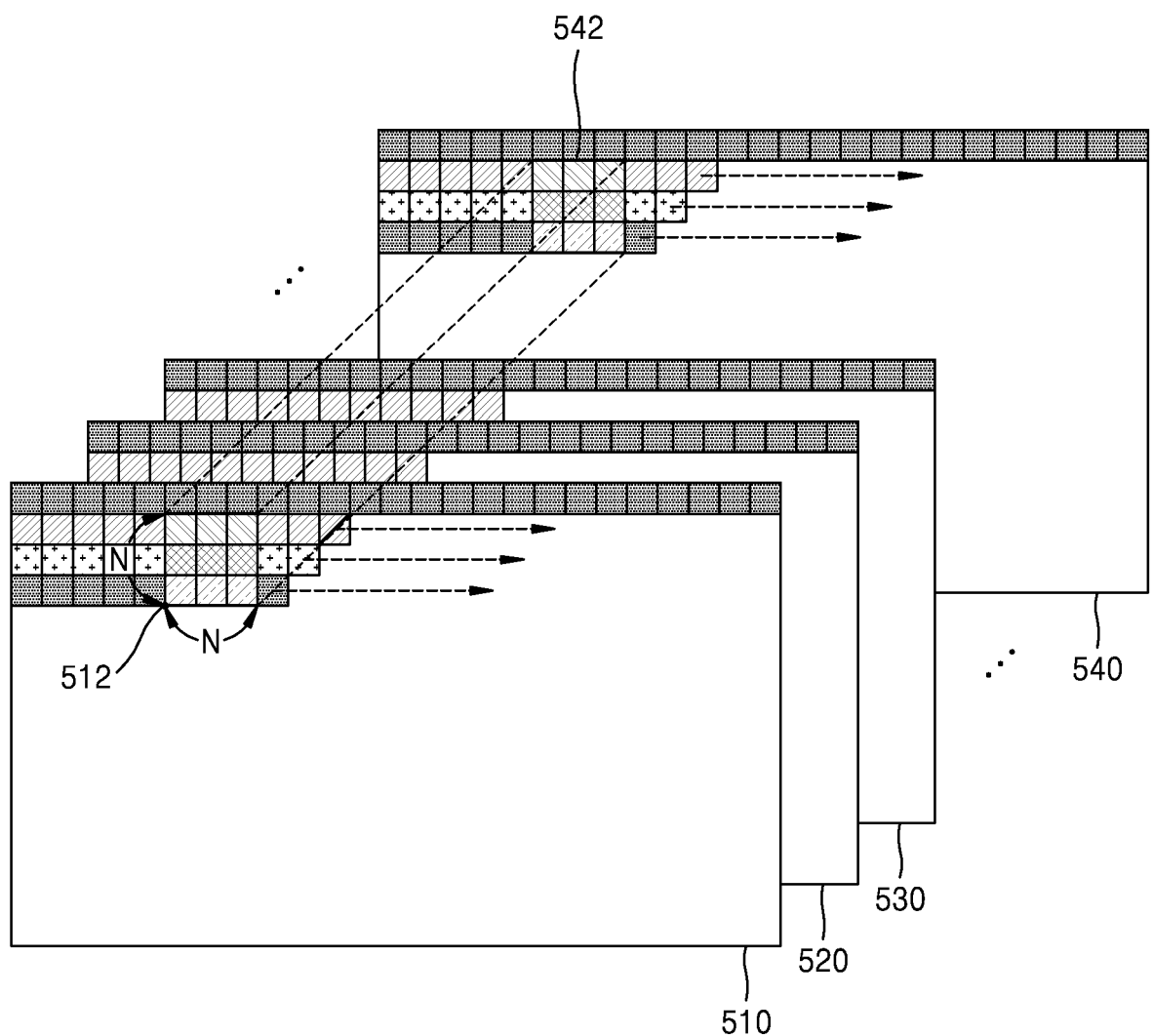
FIG. 5 is a view of a process of a convolution operation between multi-channel feature map images and a filter kernel, according to an embodiment.

FIG. 5 is a view of a process of a convolution operation between multi-channel feature map images and a filter kernel according to an embodiment.

A neural network-based image processing process according to an embodiment is a process in which a convolution operation between an input image and a filter kernel is performed in each layer. Referring to FIG. 5, application of N×N×K sized filter kernels 512 and 542 for convolution for generating multi-channel feature map images 510, 520, 530, and 540 and one output pixel is shown visually.

According to an embodiment, in the $l^{th}$ layer of the CNN, the convolution operation is applied to the multi-channel feature map images 510, 520, 530, and 540 generated in the $(l-1)^{th}$ layer with the filter kernels 512 and 542 having L of N×N×K pixel weights. Referring to FIG. 5, when the number of input channels in the layer is K, the size of the input data to be operated with the filter kernel will be N×N×K. A feature map of L channels is generated in the $l^{th}$ layer by the operation with the L of N×N×K filter kernels.

According to an embodiment, a formula for the convolution operation of the CNN may be expressed as Equation 1.

$$y[l][x][y] = \sum_{k=0}^{K-1} \sum_{m=-\frac{N}{2}}^{\frac{N}{2}} \sum_{n=-\frac{N}{2}}^{\frac{N}{2}} (w[l][k][m][n] * p[k][x+m][y+n] + b)$$

$$(l = 0, \ldots, L-1)$$

[Equation 1]

In Equation 1, l denotes the number of channels of multi-channel output images, x and y denote pixel positions in an image, each of K and N denotes a channel direction and the size of a filter kernel in a row/column direction, and b denotes a constant. w[l] [k] [m] [n] denotes a coefficient of the filter kernel, p[k] [x+m] [y+n] denotes a pixel value of a feature map image input to a current layer, and y[I] [x] [y] denotes a pixel value of a feature map image generated through a convolution operation in the current layer. According to Equation 1, the convolution operation in the layer of the CNN is performed on a pixel-by-pixel basis.

Figure 6:
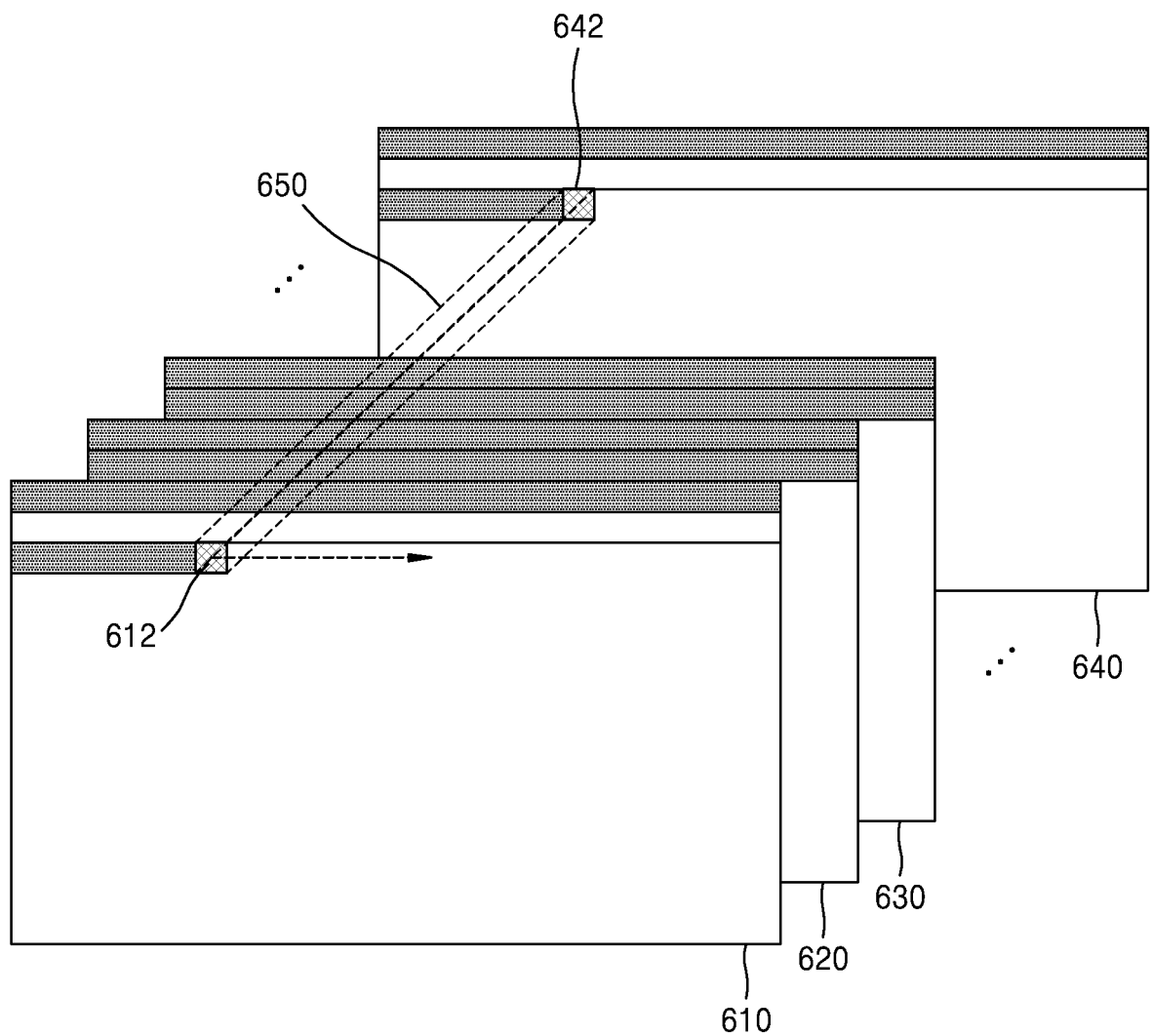
FIG. 6 is a view of a coding unit for processing multi-channel feature map images, according to an embodiment.

FIG. 6 is a view of a coding unit for processing multi-channel feature map images 610, 620, 630, and 640, according to an embodiment.

FIG. 6 shows the multi-channel feature map images 610, 620, 630, and 640 and a coding unit 650 as a unit used in processing the multi-channel feature map images 610, 620, 630, and 640.

The coding unit 650 according to an embodiment may be in the form of a group of blocks or pixels existing at the same position in a feature map image of each channel. For example, as shown in FIG. 6, the coding unit 650 may include a pixel 612 in a feature map image 610 of a first channel and a pixel in a feature map image 620 of a second channel, and may further include a pixel 642 in a feature map image 640 of a $K^{th}$ channel. Accordingly, a size of the coding unit 650 according to an embodiment may be represented as 1×1×K (i.e., N=1). However, a shape of the coding unit may be any geometric shape, and is not limited to a certain size of data unit.

The image encoding device 400 according to an embodiment may sequentially encode the coding unit 650 according to a predetermined scan order. Also, the image decoding device 450 according to an embodiment may sequentially decode the coding unit 650 according to a predetermined scan order.

Since the multi-channel feature map images 610, 620, 630, and 640 are processed based on the coding unit 650 according to an embodiment, pipeline processing with an arithmetic operation of the CNN may be enabled.

Hereinafter, a process in which an image processing operation for the multi-channel feature map images 610, 620, 630, and 640 of FIG. 6 and a subsequent CNN computational operation are sequentially pipelined.

For example, it is assumed that the multi-channel feature map images 610, 620, 630, and 640 are data generated by a convolution operation with K filter kernels in the $I^{th}$ layer. That is, the multi-channel feature map images 610, 620, 630, and 640 have K channels. Image processing for compression may be performed on the multi-channel feature map images 610, 620, 630, and 640 before the convolution operation in the $(I+1)^{th}$ layer is performed. In more detail, the coding unit 650 having a size of 1×1×K may be determined as a basic unit of the image processing for the multi-channel feature map images 610, 620, 630, and 640.

According to an embodiment, the image encoding device 400 may encode the multi-channel feature map images 610, 620, 630, and 640 based on the coding unit 650. Since an encoding process in the image encoding device 400 is as described above with reference to FIG. 4A, a detailed description thereof will not be given herein. According to an embodiment, the image encoding device 400 outputs encoded image data of a coding unit in the form of a bitstream and transmits the image data to the memory 270. The encoded image data of a coding unit may be stored in the memory 270 for a certain period of time and then used in the $(I+1)^{th}$ layer. Therefore, it is not necessary that the entire image data for the multi-channel feature map images 610, 620, 630, and 640 is encoded and stored in the memory 270, and it is sufficient when only image data necessary for the convolution operation in the $(I+1)^{th}$ layer is stored. According to an embodiment, the image encoding device 400 may group the encoded data of a horizontal section having a width direction and a channel direction among sets of the multi-channel feature map images 610, 620, 630, and 640 in a bitstream. A method of partitioning the bitstream according to an embodiment will be described in detail with reference to FIG. 10.

According to an embodiment, during an encoding operation of the multi-channel feature map images 610, 620, 630, and 640 in the image encoding device 400, the image data of the coding unit that is encoded in the encoding process of the image encoding device 400 may be used in the $(I+1)^{th}$ layer. According to Equation 1, since the convolution operation in the CNN is performed on a pixel-by-pixel basis, the data used in the $(I+1)^{th}$ layer may also be in pixel units. Prior to this, the image encoding device 400 generates image data of a coding unit using a coding unit of 1×1×K (i.e., pixel unit). Accordingly, in the $(I+1)^{th}$ layer, the image decoding device 450 may decode the image data of the coding unit to receive image data in pixel units from the memory 270.

According to an embodiment, the image decoding device 450 may decode the multi-channel feature map images 610, 620, 630, and 640 based on the coding unit 650. Since the decoding process in the image decoding device 450 is as described above with reference to FIG. 4B, detailed descriptions thereof are not repeated herein. The image decoding device 450 according to an embodiment decodes and outputs image data of a coding unit which is data necessary for a convolution operation in the $(I+1)^{th}$ layer to enable parallel processing of image processing and the CNN computational operation. In other words, a decoding operation in the video decoding device 450 and a convolution operation in the $(I+1)^{th}$ layer may be performed simultaneously.

As described above, the convolution operation in a layer of the CNN is performed on a pixel-by-pixel basis. Therefore, when a coding unit of a block unit size (i.e., X×Y×Z) larger than a pixel unit is used, a basic unit of image processing is different from that of the convolution operation, and sequential pipeline processing is impossible. Also, when using the coding unit of size X×Y×Z for image processing, data traffic for intermediate results during the CNN execution and a required network bandwidth increase and the capacity of an internal buffer needs to be larger.

According to an embodiment, when multi-channel feature map images are processed using the coding unit of size 1×1×K, a basic unit of image processing corresponds to that of the convolution operation, and thus sequential pipeline processing is possible. In addition, the image processing process using the coding unit of size 1×1×K has an advantage that the capacity of an internal buffer is minimized.

Figure 7:
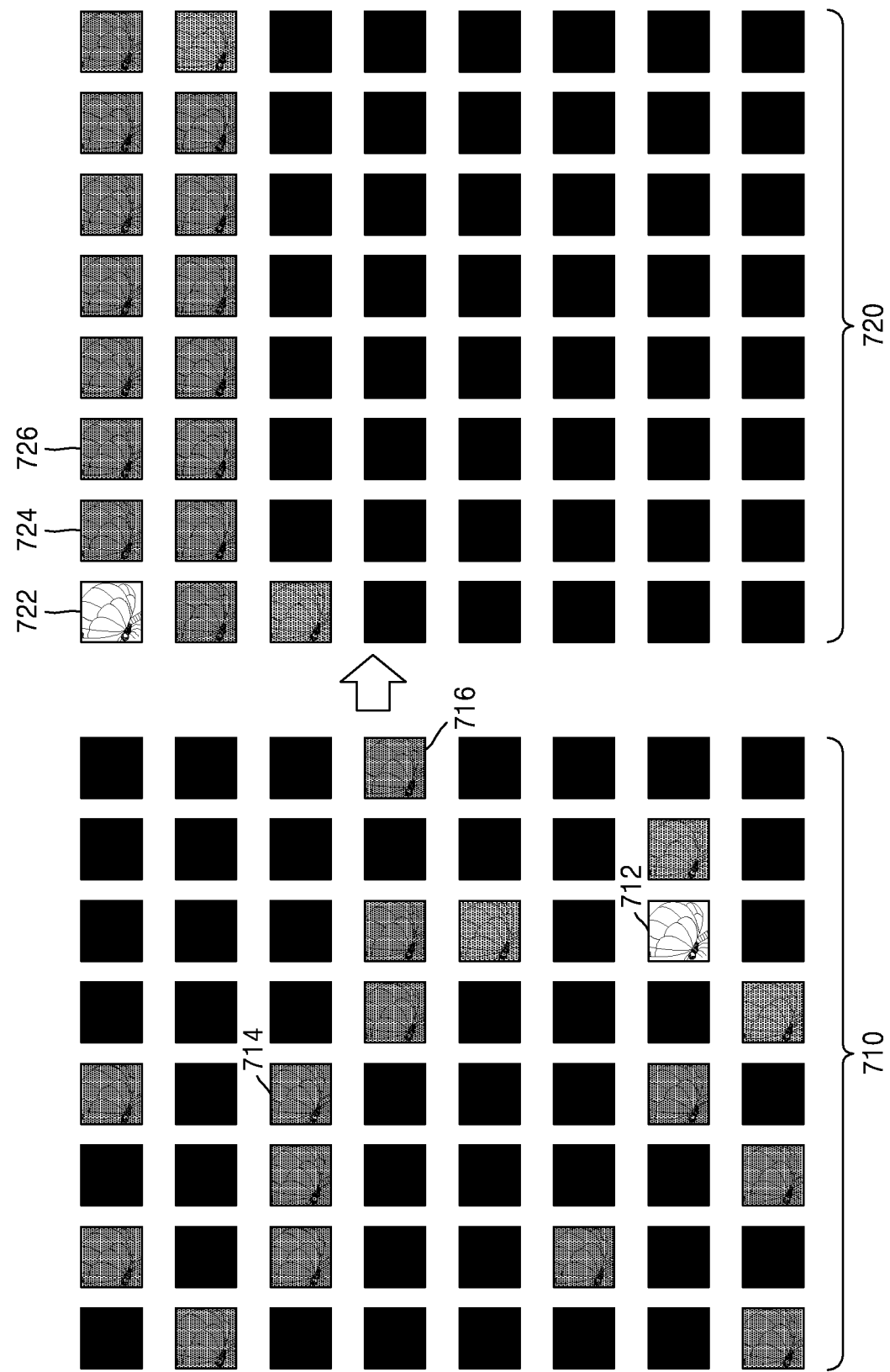
FIG. 7 is a view of a method of re-ordering sets of multi-channel feature map images, according to an embodiment.

FIG. 7 is a view of a method of re-ordering sets of multi-channel feature map images, according to an embodiment.

The image encoding device 400 according to an embodiment may re-order an order of the multi-channel feature map images generated in a neural network-based image processing process for more efficient encoding. FIG. 7 shows feature map images 710 before re-ordering and feature map images 720 after re-ordering. FIG. 7 shows that the feature map images 710 before re-ordering and the feature map images 720 after re-ordering have 64 channels, respectively. However, this is for convenience of explanation, and the number of channels is not limited to 64.

Referring to FIG. 7, it can be seen that a dynamic range change of pixel values of each image is not constant in the feature map images 710 before re-ordering. The dynamic range is obtained by subtracting a minimum output value from a maximum output value of a feature map image for each channel. The image encoding device 400 according to an embodiment may perform inter-channel inter-prediction at the time of prediction. However, when the dynamic range change of pixel values of each image is larger like the feature map images 710 before re-ordering, compression performance may be degraded. In order to solve the degradation of the compression performance in the inter-channel inter-prediction, the image encoding device 400 according to an embodiment may improve compression performance by increasing the degree of correlation between feature map images adjacent to each other in a channel direction.

Hereinafter, a specific method of analyzing a dynamic range of the feature map images 710 before re-ordering and reconstructing the feature map images 720 after re-ordering will be described.

The image encoding device 400 according to an embodiment may analyze characteristics of a filter kernel of a layer and re-order sets of multi-channel feature map images according to a dynamic range of each feature map image. In more detail, the image encoding device 400 may input a specific value into a filter kernel of each channel and derive a maximum output value of a feature map image for each channel. For example, the image encoding device 400 may input a maximum value (e.g., 255) when the weight of a filter kernel is positive, and may input 0 when the weight of a filter kernel is negative. Also, the image encoding device 400 may input a specific value into the filter kernel of each channel and derive a minimum output value of a feature map image for each channel. For example, the image encoding device 400 may input a maximum value (e.g., 255) when the weight of a filter kernel is negative, and may input 0 when the weight of a filter kernel is positive. When a dynamic range of a feature map image for each channel is derived from the maximum output value and the minimum output value of the feature map image for each channel, the image encoding device 400 according to an embodiment may re-order the sets of the multi-channel feature map images based on the derived dynamic range. For example, the image encoding device 400 may re-order sets of multi-channel feature map images in descending order or ascending order according to the dynamic range.

FIG. 7 shows the feature map images 720 after being re-ordered in descending order according to the dynamic range. A feature map image 712 having the largest dynamic range value among the feature map images 710 before re-ordering is arranged at the position 722 of a first channel among the feature map images 720 after re-ordering. A feature map image 714 having the second largest dynamic range value and a feature map image 716 having the third largest dynamic range value among the feature map images 710 before re-ordering are arranged at the position 724 of a second channel and the position 726 of a third channel among the feature map images 720 after re-ordering.

As described above, the feature map images 720 after re-ordering have the higher degree of correlation between feature map images adjacent to each other in a channel direction as compared with the feature map images 710 before re-ordering. Therefore, when the image encoding device 400 performs inter-channel inter-prediction using the feature map images 720 after re-ordering as sets of multi-channel feature map images, compression performance may be improved.

Upon completion of the encoding based on the feature map images 720 after re-ordering, the image decoding device 450 according to an embodiment decodes the feature map images 720 after re-ordering. According to an embodiment, the image decoding device 450 may use re-ordering information obtained from a bitstream to reconstruct the decoded feature map images 720 after re-ordering in an original channel order. According to an embodiment, the re-ordering information may include at least one of index information indicating an original position of the feature map images 710 before re-ordering and information on a movement history of the feature map images 710. In addition, the index information according to an embodiment may include information on a sort order of each channel. The re-ordering information according to an embodiment may be encoded in the image encoding device 400 and stored in a header in the bitstream.

Figure 8:
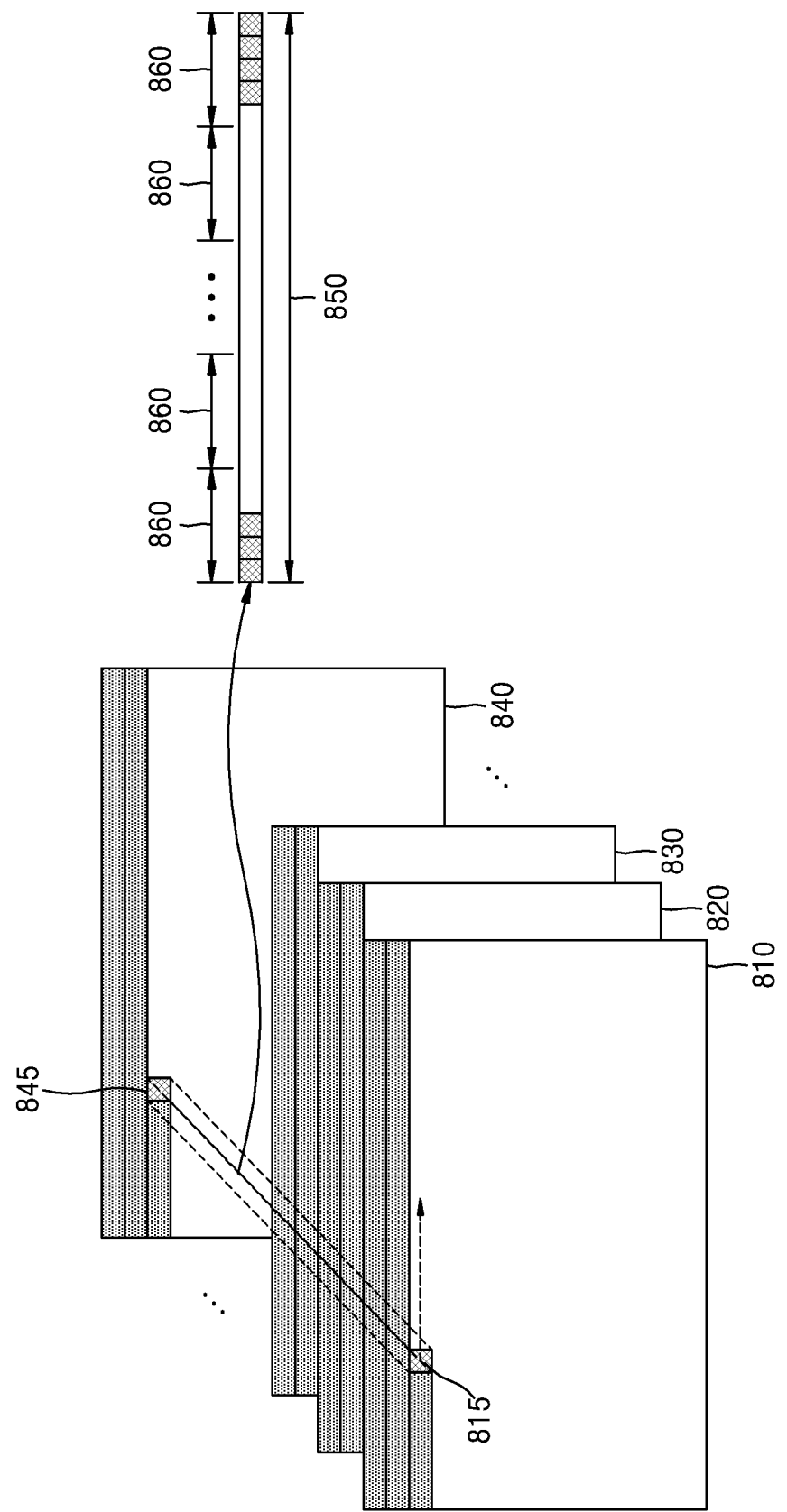
FIG. 8 is a view of a method of dividing a coding unit into sub-coding units, according to an embodiment.

FIG. 8 is a view of a method of dividing a coding unit into sub-coding units, according to an embodiment.

FIG. 8 shows multi-channel feature map images 810, 820, 830, and 840, a coding unit 850, and sub-coding units 860 divided from the coding unit 850. The multi-channel feature map images 810, 820, 830, and 840 and the coding unit 850 shown in FIG. 8 may correspond to the multi-channel feature map images 610, 620, 630, and 640 and the coding unit 650 shown in FIG. 6, respectively.

As described above with reference to FIG. 7, the image encoding device 400 may perform encoding based on sets of re-ordered feature map images, and the image decoding device 450 may decode the sets of re-ordered feature map images. The sets of re-ordered feature map images have a higher degree of correlation between feature map images adjacent to each other in a channel direction. Therefore, the feature map images adjacent to each other in a channel direction may have similar directions of inter-pixel prediction. According to an embodiment, the image coding device 400 (or the image decoding device 450) performs prediction by setting sub-blocks having similar prediction directions in the coding unit 850 as a basic predictor at the time of prediction of the coding unit 850. As described above, encoding (or decoding) is performed in the sub-blocks having similar prediction directions in the same prediction mode. The sub-blocks are divided in a depth direction of a channel from the coding unit 850, and are referred to as the sub-coding units 860 hereinafter.

Hereinafter, a description will be made in detail of a process of performing prediction for each sub-coding unit with reference to FIG. 9.

Figure 9:
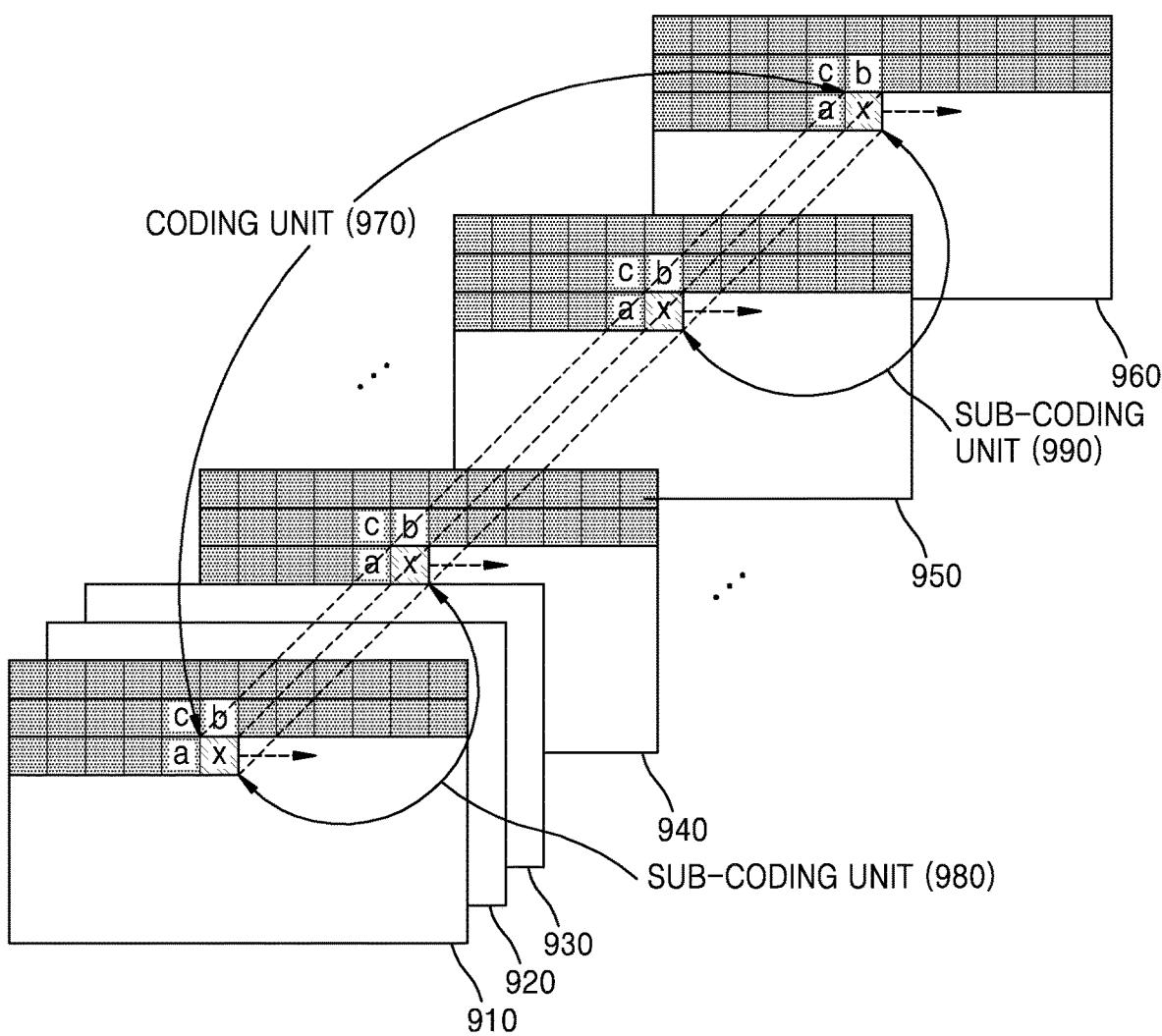
FIG. 9 is a view of a process of performing prediction for each sub-coding unit, according to an embodiment.

FIG. 9 is a view of a process of performing prediction for each sub-coding unit, according to an embodiment.

FIG. 9 shows multi-channel feature map images 910, 920, 930, 940, 950, and 960, a coding unit 970, and at least one of sub-coding units 980 and 990. The at least one of sub-coding units 980 and 990 in FIG. 9 is divided from the coding unit 970 and a method of dividing the coding unit 970 into the at least one sub-coding units 980 and 990 is the same as described above with reference to FIG. 8, and thus, a detailed description thereof will not be given herein.

Referring to FIG. 9, the image encoding device 400 (or the image decoding device 450) processes the multi-channel feature map images 910, 920, 930, 940, 950, and 960 on the basis of the coding unit 970. A prediction operation in the coding unit 970 may be performed for each of the at least one of sub-coding units 980 and 990. That is, according to an embodiment, prediction is performed in the same sub-coding unit in the same prediction mode.

For example, the coding unit 970 of the multi-channel feature map images 910, 920, 930, 940, 950, and 960 may include the sub-coding unit 980 and the sub-coding unit 990. A spatial prediction mode in a first direction may be applied to the sub-coding unit 980, and a spatial prediction mode in a second direction may be applied to the sub-coding unit 990. A spatial prediction mode may include, for example, various modes as shown in Table 1, and prediction methods of respective modes may be different from each other.

TABLE 1

| Prediction Mode | Prediction Method |
|---|---|
| 0 | Pred_x = a + b − c |
| 1 | Pred_x = a |
| 2 | Pred_x = b |
| 3 | Pred_x = (a + b + c) >> 1 |
| 4 | Pred_x = c |

In Table 1, "Pred_x" denotes a predicted value of a sub-coding unit, and "a", "b", and "c" denote pixel values around the sub-coding unit. However, prediction modes and prediction methods shown in Table 1 are illustrative, and prediction may be performed by various modified embodiments.

The image encoding device 400 according to an embodiment may encode information on a prediction mode of at least one of the sub-coding units 980 and 990. The information on the prediction mode may include not only the prediction method but also information on other encoding modes for the sub-coding unit. According to an embodiment, the information on the prediction mode encoded by the image encoding device 400 may be included in a header of a bitstream and stored in the memory 270.

The image decoding device 450 according to an embodiment may obtain prediction mode information from the header of the bitstream stored in the memory 270 and may predict or decode at least one of the sub-coding units 980 and 990.

Meanwhile, the prediction mode of the sub-coding unit 980 may be the same as or different from that of the sub-coding unit 990. Accordingly, the image encoding device 400 according to an embodiment may encode information on whether a prediction mode of a current sub-coding unit is the same as that of a previous sub-coding unit. That is, the image encoding device 400 may predict header information indicating a prediction mode between at least one of the sub-coding units 980 and 990. The image encoding device 400 is information for indicating whether the prediction mode of the sub-coding unit 990 is the same as that of the sub-coding unit 980, and it suffices to allocate only one bit. When the prediction mode of the sub-coding unit 990 is different from that of the sub-coding unit 980, the image encoding device 400 further encodes information on the prediction mode of the sub-coding unit 990.

The image decoding device 450 according to an embodiment may obtain information on whether a prediction mode of a current sub-coding unit is the same as that of a previous sub-coding unit from the header of the bitstream stored in the memory 270. When the prediction mode of the current sub-coding unit is not the same as that of the previous sub-coding unit, the image decoding device 450 additionally obtains information on the prediction mode of the current sub-coding unit from the header of the bitstream.

Figure 10:
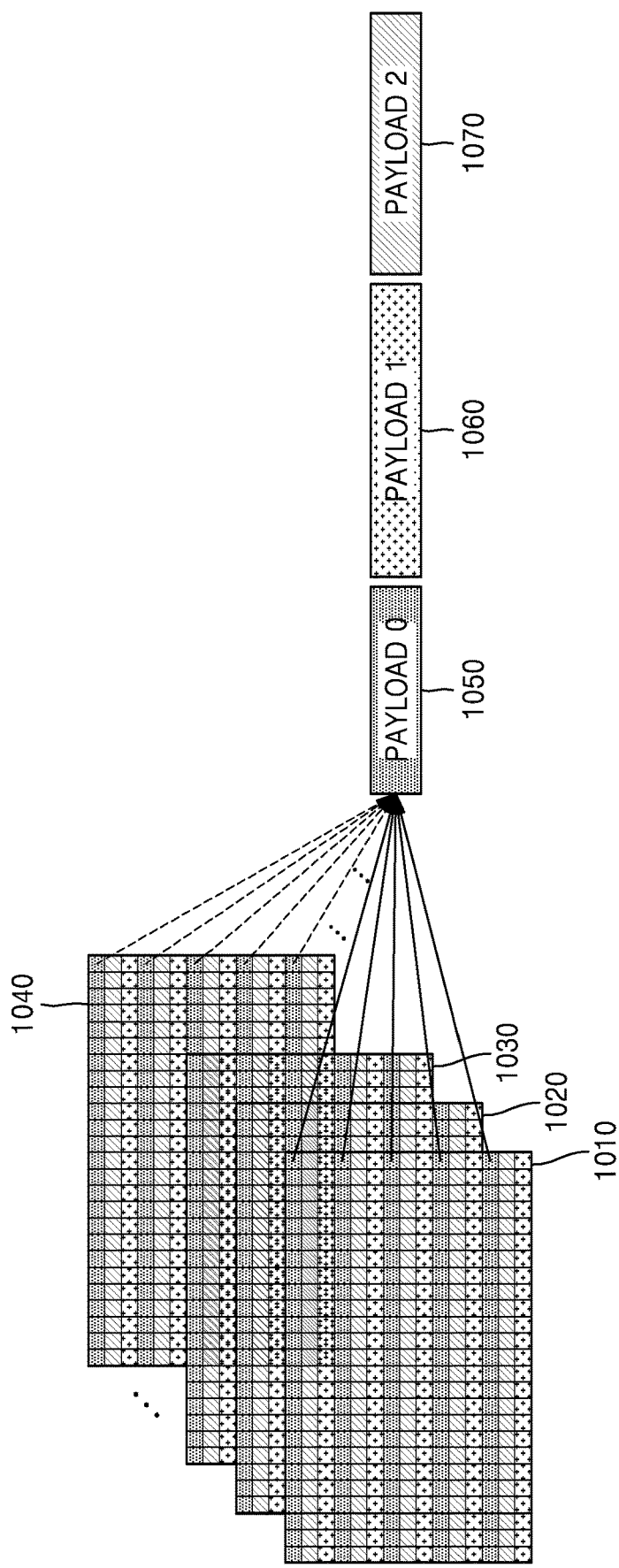
FIG. 10 is a view of a method of configuring partitions of a bitstream, according to an embodiment.

FIG. 10 is a view of a method of configuring partitions 1050, 1060, and 1070 of a bitstream, according to an embodiment.

FIG. 10 shows multi-channel feature map images 1010, 1020, 1030, and 1040 and the partitions 1050, 1060, and 1070 of the bitstream. The multi-channel feature map images 1010, 1020, 1030, and 1040 of FIG. 10 may correspond to the multi-channel feature map images 610, 620, 630, and 640 of FIG. 6 and the multi-channel feature map images 810, 820, 830, and 840 of FIG. 8, respectively.

A bitstream structure according to an embodiment may include the plurality of independent partitions 1050, 1060, and 1070 as shown in FIG. 10. In the CNN computational operation of size N×N×K as described above in FIG. 5, the memory 270 may simultaneously read/write pixel values of multi-channel feature map images for each line or each row for image processing and pipeline processing of the CNN computational operation. To this end, the image encoding device 400 may encode the multi-channel feature map images 1010, 1020, 1030, and 1040 in a predetermined order based on a coding unit, and may generate encoded data of a horizontal section having a width direction and a channel direction among sets of the multi-channel feature map images 1010, 1020, 1030, and 1040 and store the encoded data in a specific partition of the bitstream. For example, in a case of a CNN computational operation for an N×N×K region an N×K plane may be independently compressed and stored in a specific partition of the bitstream.

According to another embodiment, when K is smaller than a predetermined set value, each row in feature map images may be determined as a coding unit. That is, the coding unit may be determined not in a channel direction of sets of multi-channel feature map images but in a row direction of each feature map image. Here, encoded data of a horizontal section having a width direction and a channel direction among the sets of the multi-channel feature map images 1010, 1020, 1030, and 1040 may be stored in a specific partition of the bitstream.

Figure 11:
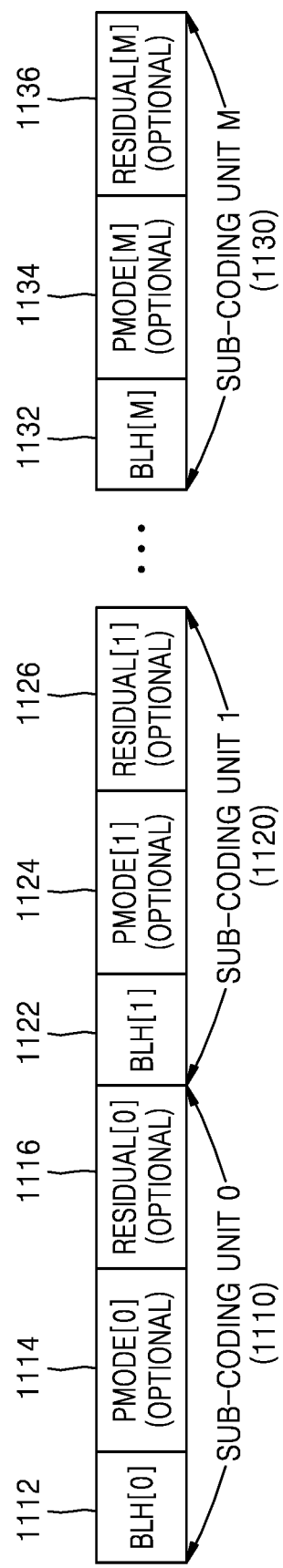
FIG. 11 is a view of a method of configuring a bitstream, according to an embodiment.

FIG. 11 is a view of a method of configuring a bitstream, according to an embodiment.

FIG. 11 shows the sub-coding units 1110, 1120, and 1130 and a bit configuration of each of the sub-coding units 1110, 1120, and 1130. The sub-coding units 1110, 1120, and 1130 of FIG. 11 correspond to the sub-coding unit 860 of FIG. 8, and a detailed description of sub-coding unit division and sub-coding unit prediction will not be given herein.

According to an embodiment, each of the sub-coding units 1110, 1120, and 1130 includes a bit-length header (BLH) 1112, 1122, and 1132, information 1114, 1124, and 1134 on prediction modes, and residual signals 1116, 1126, and 1136 according to the prediction modes. The information 1114, 1124, and 1134 on prediction modes and the residual signals 1116, 1126, and 1136 according to the prediction modes may be selectively included in a bit configuration according to an embodiment.

Bit-length headers 1112, 1122, and 1132 according to an embodiment may include information on whether all residual values in a sub-coding unit are 0. For example, when a value of the bit-length header 1112, 1122, 1132 is "0", all residual values in a sub-coding unit are 0, and thus, signaling of the residual signals may be omitted. In addition, the bit-length headers 1112, 1122, and 1132 according to an embodiment may include a signal obtained by subjecting all residual values in a sub-coding unit to fixed-length coding. The bit-length header 1112, 1122, and 1132 according to an embodiment may also include a signal in which all residual values in a sub-coding unit are represented by 8-bit original pixel values. In this case, prediction mode information may be omitted.

Figure 12:
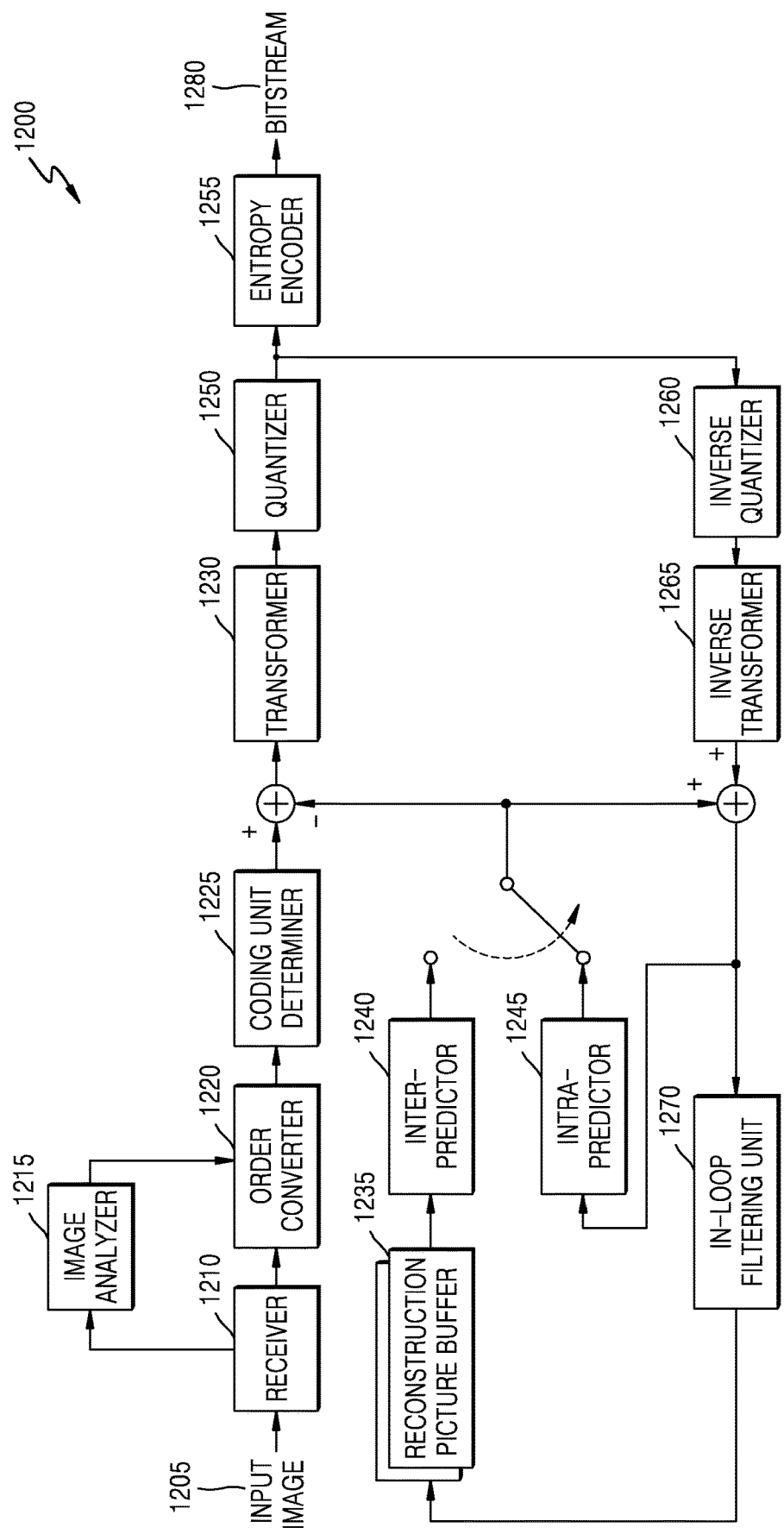
FIG. 12 is a block diagram of an image encoding device according to an embodiment.

FIG. 12 is a block diagram of an image encoding device 1200 according to an embodiment.

The image encoding device 1200 of FIG. 12 shows the image encoding device 400 of FIG. 4A in more detail, and the image encoding device 400 may be included in the image encoding device 1200.

The image coding device 1200 according to an embodiment includes a receiver 1210, an image analyzer 1215, an order converter 1220, a coding unit determiner 1225, a transformer 1230, a reconstruction picture buffer 1235, an inter-predictor 1240, an intra-predictor 1245, a quantizer 1250, an entropy encoder 1255, an inverse quantizer 1260, an inverse transformer 1265, and an in-loop filtering unit 1270.

The receiver 1210 and the coding unit determiner 1225 of FIG. 12 may correspond to the receiver 410 and the coding unit determiner 420 of FIG. 4A. Furthermore, 12, the transformer 1230, the reconstruction picture buffer 1235, the inter-predictor 1240, the intra-predictor 1245, the quantizer 1250, the entropy encoder 1255, the inverse quantizer 1260, the inverse transformer 1265, and the in-loop filtering unit 1270 of FIG. 12 may be included in the encoder 430 of FIG. 4A.

The image analyzer 1215 according to an embodiment may analyze a dynamic range of multi-channel feature map images. Operations of the image analyzer 1215 according to an embodiment may include operations for analyzing the dynamic range described with reference to FIG. 7.

The order converter 1220 according to an embodiment may re-order sets of multi-channel feature map images based on the dynamic range of the multi-channel feature map images. Operations of the order converter 1220 according to an embodiment may include the operations for re-ordering described with reference to FIG. 7.

The intra-predictor 1245 performs intra-prediction on an intra-mode coding unit among the input image 1205 for each predictor, and the inter-predictor 1240 performs inter-prediction on an inter-mode coding unit using the input image 1205 and a reference image obtained from the reconstruction picture buffer 1235 for each predictor. The input image 1205 may be multi-channel feature map images generated in a layer of a CNN.

Residual data is generated by calculating a difference between data for a coding unit of the input image 1205 and prediction data for a coding unit of each mode output from the intra-predictor 1245 or the inter-predictor 1240. The residual data is output as a quantized transform coefficient for each transform unit through the transformer 1230 and the quantizer 1250. The quantized transform coefficient is reconstructed as residual data of a spatial domain by using the inverse quantizer 1260 and the inverse transformer 1265. The residual data of the reconstructed spatial domain is added to the prediction data for the coding unit of each mode output from the intra-predictor 1245 or the inter-predictor 1240, and is thereby reconstructed as data of a spatial domain for the coding unit of the input image 1205. The reconstructed data of the spatial domain is generated as a reconstructed image through the in-loop filtering unit 1270. The in-loop filtering unit 1270 may perform deblocking only, or may perform sample adaptive offset (SAO) filtering after the deblocking. The generated reconstruct image is stored in the reconstruction picture buffer 1235. The reconstructed images stored in the reconstructed picture buffer 1235 may be used as reference images for inter-prediction of other images. The transform coefficient quantized by the transformer 1230 and the quantizer 1250 may be output to a bitstream 1280 through the entropy encoder 1255.

According to various embodiments, components of the image encoding device 1200 may perform encoding operations based on the coding units of the multi-channel feature map images described in FIG. 6 and/or the sub-coding units described in FIG. 8.

Figure 13:
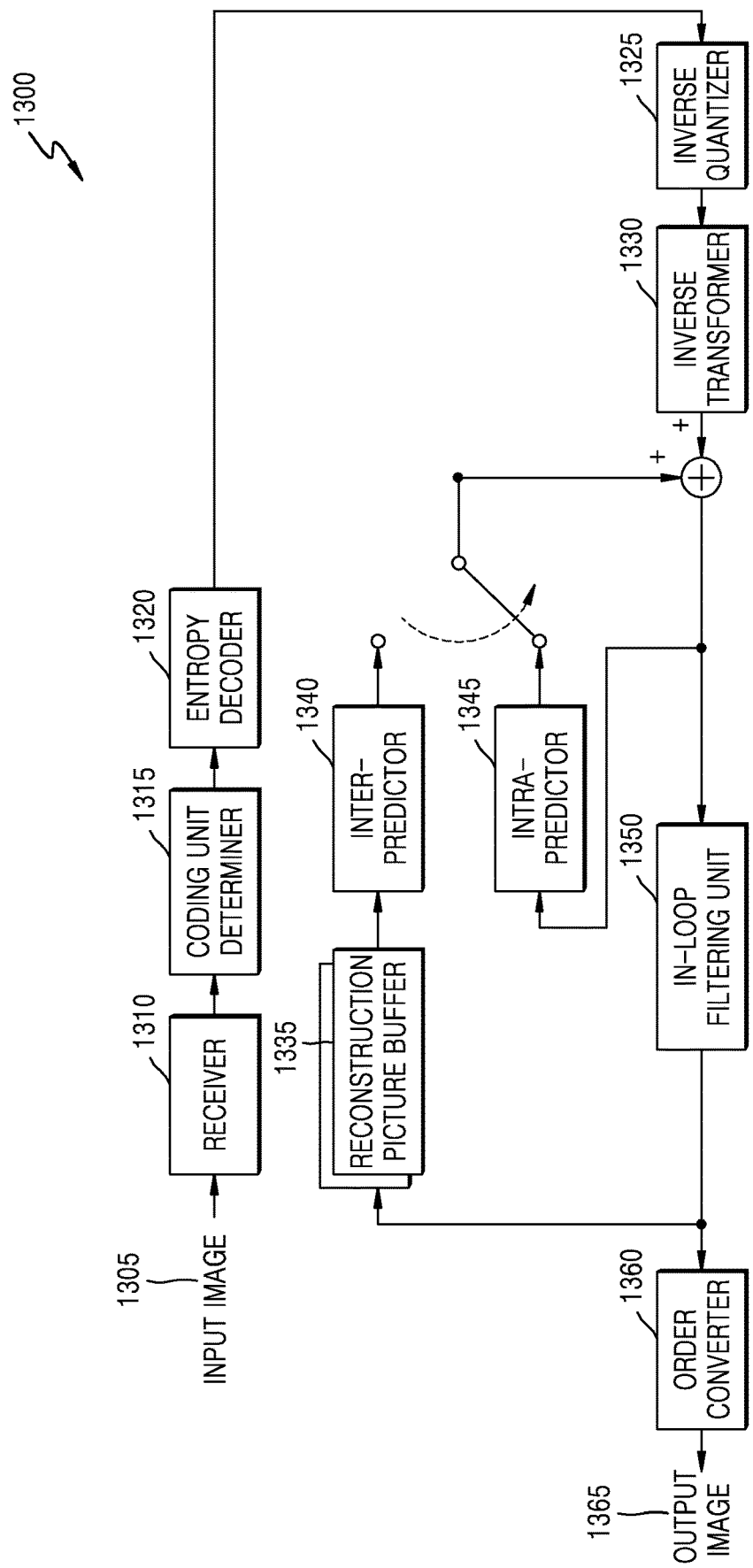
FIG. 13 is a block diagram of an image decoding device according to an embodiment.

FIG. 13 is a block diagram of an image decoding device 1300 according to an embodiment.

The image decoding device 1300 according to an embodiment performs operations for decoding an image. The image decoding device 1300 according to an embodiment includes a receiver 1310, a coding unit determiner 1315, an entropy decoder 1320, an inverse quantizer 1325, an inverse transformer 1330, a reconstruction picture buffer 1335, an inter-predictor 1340, an intra-predictor 1345, an in-loop filtering unit 1350, and an order converter 1360.

The receiver 1310 and the coding unit determiner 1315 of FIG. 12 may correspond to the receiver 460 and the coding unit determiner 470 of FIG. 4B. Furthermore, the entropy decoder 1320, the inverse quantizer 1325, the inverse transformer 1330, the reconstruction picture buffer 1335, the inter-predictor 1340, the intra-predictor 1345, the in-loop filtering unit 1350, and the order converter 1360 of FIG. 13 may be included the decoder 480 of FIG. 4.

The entropy decoder 1320 obtains, from a bitstream 1305, encoded image data to be decoded and encoding information necessary for the decoding. The encoded image data is a quantized transform coefficient, and the inverse quantizer 1325 and the inverse transformer 1330 reconstruct residual data from the quantized transform coefficient.

The intra-predictor 1345 performs intra-prediction on an intra-mode coding unit for each predictor. The inter-predictor 1340 performs inter-prediction using a reference image obtained from the reconstruction picture buffer 1335 on an inter-mode coding unit for each predictor.

Data of a spatial domain for a coding unit is reconstructed by adding prediction data for a coding unit of each mode by using the intra-predictor 1345 or the inter-predictor 1340 to residual data, and the reconstructed data of the spatial domain may be output as a reconstructed image by using the in-loop filtering unit 1350. The in-loop filtering unit 1350 may perform deblocking only, or may perform SAO filtering after the deblocking. The reconstructed image may be feature map images that are re-ordered based on a dynamic range.

The order converter 1360 according to an embodiment reconstructs decoded feature map images after re-ordering into an original channel order and outputs the reconstructed feature map images as an output image 1365. According to an embodiment, operations of the order converter 1360 may include the operations for reconstructing the order described with reference to FIG. 7.

According to various embodiments, components of the image encoding device 1300 may perform decoding operations based on the coding units of the multi-channel feature map images described in FIG. 6 and/or the sub-coding units described in FIG. 8.

Figure 14:
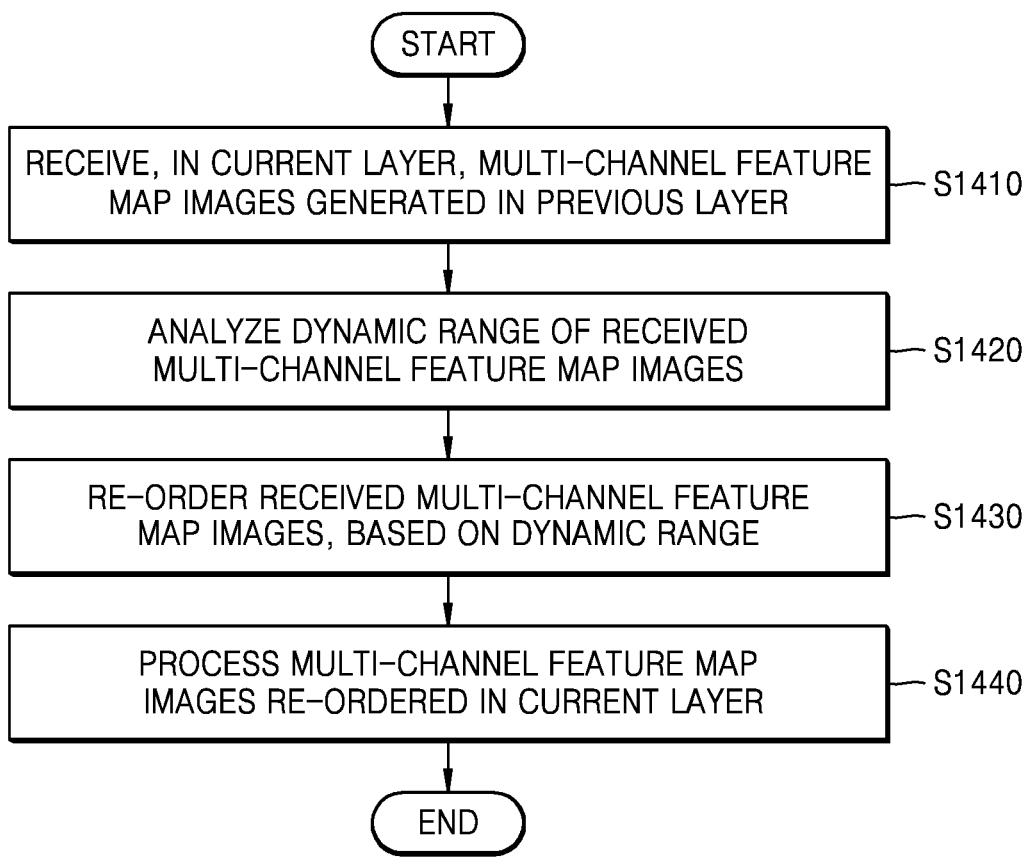
FIG. 14 is a flowchart of an image processing method according to an embodiment.

FIG. 14 is a flowchart of an image processing method according to an embodiment.

In operation S1410, the image processing device 300 receives, in a current layer, multi-channel feature map images generated in the previous layer.

In operation S1420, the image processing device 300 analyzes a dynamic range of the received multi-channel feature map images.

In operation S1430, the image processing device 300 re-orders the received multi-channel feature map images, based on the dynamic range.

In operation S1440, the image processing device 300 processes the multi-channel feature map images re-ordered in the current layer.

While the embodiments have been particularly shown and described, it will be understood by those of ordinary skill in the art that various changes in form and details may be made therein without departing from the spirit and scope of the disclosure as defined by the appended claims. Accordingly, the disclosure should be understood only in accordance with the following claims, and all equivalent or equivalent variations thereof are included in the scope of the disclosure. Furthermore, a system according to the disclosure may also be embodied as computer-readable codes on a non-transitory computer-readable recording medium.

The non-transitory computer-readable recording medium is any data storage device that can store data which can thereafter be read by a computer system. Examples of the non-transitory computer-readable recording medium include ROM, RAM, CD-ROMs, magnetic tapes, floppy disks, optical data storage devices, etc. The non-transitory computer-readable recording medium can also be distributed over network coupled computer systems so that the computer-readable code is stored and executed in a distributive manner.

What is claimed is:

1. A convolutional neural network-based image processing method comprising:
   receiving, in a second layer, multi-channel feature map images generated by applying a convolution operation to an input image of a convolutional neural network having a plurality of layers with a plurality of filter kernels of a first layer;
   analyzing a dynamic range of the multi-channel feature map images;
   re-ordering the multi-channel feature map images, based on the dynamic range; and
   processing the re-ordered multi-channel feature map images in the second layer.

2. The convolutional neural network-based image processing method of claim 1, wherein the analyzing comprises obtaining the dynamic range for each of the multi-channel feature map images, based on a maximum output value and a minimum output value of each of the plurality of filter kernels of the first layer.

3. The convolutional neural network-based image processing method of claim 1, wherein the re-ordering comprises aligning the multi-channel feature map images in a descending order or an ascending order in a channel direction, based on the dynamic range.

4. The convolutional neural network-based image processing method of claim 1, wherein the processing comprises performing inter-channel inter-prediction on the re-ordered multi-channel feature map images.

5. The convolutional neural network-based image processing method of claim 1, wherein the processing comprises performing encoding and decoding operations on the re-ordered multi-channel feature map images,
   wherein the encoding and decoding operations in the second layer are performed according to a pipelined process with a convolution operation in a layer subsequent to the second layer among the plurality of layers.

6. The convolutional neural network-based image processing method of claim 1, wherein the processing comprises determining a coding unit having a pixel depth in a channel direction of the multi-channel feature map images, the pixel depth corresponding to a number of channels in the channel direction in the multi-channel feature map images.

7. The convolutional neural network-based image processing method of claim 6, wherein the coding unit corresponds to a basic unit of a filter kernel operation in a layer subsequent to the second layer among the plurality of layers.

8. The convolutional neural network-based image processing method of claim 6, wherein a size of the coding unit is X×Y×Z, where X, Y, and Z are integers.

9. The convolutional neural network-based image processing method of claim 6, wherein the processing further comprises:
   dividing the coding unit into sub-coding units in the channel direction; and
   performing encoding on each of the sub-coding units.

10. The convolutional neural network-based image processing method of claim 9, wherein the performing of encoding on each of the sub-coding units comprises:
    encoding information on whether an encoding mode of a current sub-coding unit is equal to an encoding mode of a previous sub-coding unit; and
    encoding information on the encoding mode of the current sub-coding unit when the encoding mode of the current sub-coding unit is not equal to the encoding mode of the previous sub-coding unit.

11. A convolutional neural network-based image processing device comprises:
    a storage; and
    a controller configured to control the image processing device to receive, in a second layer, multi-channel feature map images generated by applying a convolution operation to an input image of a convolutional neural network having a plurality of layers with a plurality of filter kernels of a first layer, to analyze a dynamic range of the multi-channel feature map images, to re-order the multi-channel feature map images, based on the dynamic range, to process the re-ordered multi-channel feature map images in the second layer, and to store the processed re-ordered multi-channel feature map images in the storage.

12. The convolutional neural network-based image processing device of claim 11, wherein the controller is further configured to control the image processing device to obtain the dynamic range for each of the multi-channel feature map images, based on a maximum output value and a minimum output value of each of the plurality of filter kernels of the first layer.

13. The convolutional neural network-based image processing device of claim 11, wherein the controller is further configured to control the image processing device to align the multi-channel feature map images in a descending order or an ascending order in a channel direction, based on the dynamic range.

14. The convolutional neural network-based image processing device of claim 11, wherein the controller is further configured to control the image processing device to perform inter-channel inter-prediction on the re-ordered multi-channel feature map images.

15. The convolutional neural network-based image processing device of claim 11, wherein the controller is further configured to control the image processing device to perform encoding and decoding operations on the re-ordered multi-channel feature map images,
    wherein the controller is further configured to control the image processing device to perform the encoding and decoding operations in the second layer according to a pipelined process with a convolution operation in a layer subsequent to the second layer among the plurality of layers.

16. The convolutional neural network-based image processing device of claim 11, wherein the controller is further configured to control the image processing device to determine a coding unit having a pixel depth in a channel direction of the multi-channel feature map images, the pixel depth corresponding to a number of channels in the channel direction in the multi-channel feature map images.

17. The convolutional neural network-based image processing device of claim 16, wherein the coding unit corresponds to a basic unit of a filter kernel operation in a layer subsequent to the second layer among the plurality of layers.

18. The convolutional neural network-based image processing device of claim 16, wherein the controller is further configured to control the image processing device to control the image processing device to divide the coding unit into sub-coding units in the channel direction, and to perform encoding on each of the sub-coding units.

19. The convolutional neural network-based image processing device of claim 18, wherein the controller is configured to control the image processing device to encode information on whether an encoding mode of a current sub-coding unit is equal to an encoding mode of a previous sub-coding unit, and to encode information on the encoding mode of the current sub-coding unit when the encoding mode of the current sub-coding unit is not equal to the encoding mode of the previous sub-coding unit.

20. A non-transitory computer-readable recording medium having stored thereon program commands which, when executed, cause a convolution neural network-based image process device to perform:
receiving, in a second layer, multi-channel feature map images generated by applying a convolution operation to an input image of a convolutional neural network having a plurality of layers with a plurality of filter kernels of a first layer;
analyzing a dynamic range of the received multi-channel feature map images;
re-ordering the received multi-channel feature map images based on the dynamic range; and
processing the re-ordered multi-channel feature map images in the second layer.

* * * * *